US009621016B2

(12) United States Patent
Lee et al.

(10) Patent No.: US 9,621,016 B2
(45) Date of Patent: Apr. 11, 2017

(54) FLAT COIL ASSEMBLY FOR LORENTZ ACTUATOR MECHANISM

(71) Applicant: Apple Inc., Cupertino, CA (US)

(72) Inventors: Simon S. Lee, San Jose, CA (US); Yoshiyuki Takase, Tokyo (JP); Scott W. Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 14/569,480

(22) Filed: Dec. 12, 2014

(65) Prior Publication Data

US 2016/0056701 A1    Feb. 25, 2016

Related U.S. Application Data

(60) Provisional application No. 62/039,662, filed on Aug. 20, 2014.

(51) Int. Cl.
*H02K 41/035* (2006.01)
*G02B 7/09* (2006.01)
*H04N 5/225* (2006.01)
*H04N 5/232* (2006.01)

(52) U.S. Cl.
CPC .......... *H02K 41/0356* (2013.01); *G02B 7/09* (2013.01); *H04N 5/2253* (2013.01); *H04N 5/2254* (2013.01); *H04N 5/23212* (2013.01)

(58) Field of Classification Search
CPC .... G03B 2205/0053; G03B 7/10; G03B 7/04; G03B 348/357; G03B 396/133
See application file for complete search history.

(56) References Cited

U.S. PATENT DOCUMENTS

| | | | |
|---|---|---|---|
| 7,352,662 B2 | 4/2008 | Cho et al. | |
| 7,567,396 B2 | 7/2009 | Ji | |
| 2006/0193620 A1* | 8/2006 | Harrington | G02B 7/102 396/85 |
| 2008/0297295 A1* | 12/2008 | Yamazaki | H01F 5/003 336/90 |
| 2011/0109419 A1 | 5/2011 | Cooper et al. | |

* cited by examiner

*Primary Examiner* — Mekonnen Dagnew
(74) *Attorney, Agent, or Firm* — Robert C. Kowert; Meyertons, Hood, Kivlin, Kowert & Goetzel, P.C.

(57) ABSTRACT

A Lorentz actuator mechanism, which controls the motion of a mobile component relative to a static component, includes a flat coil assembly which is physically coupled to the mobile component in a magnetic field of one or more magnets and is configured to adjust a position of the mobile component, relative to the static component, based at least in part upon Lorentz forces. The flat coil assembly includes at least one conductor element, at least partially bounded by a set of insulator elements within an interior of the flat coil assembly, which forms a coil structure, within the interior of the flat coil assembly, which is configured to generate the Lorentz forces based at least in part upon an electrical current through the at least one conductor element.

19 Claims, 12 Drawing Sheets static component assembly mobile component assembly magnet component assembly coupling magnets to static component assembly cover assembly

FLAT COIL ASSEMBLY FOR LORENTZ ACTUATOR MECHANISM

PRIORITY INFORMATION

This application claims benefit of priority of U.S. Provisional Application Ser. No. 62/039,662 entitled "Flat Coil Assembly for Lorentz Actuator Mechanism" filed Aug. 20, 2014, the content of which is incorporated by reference herein in its entirety and for all purposes.

BACKGROUND

Technical Field

This disclosure relates generally to control of the motion of mobile components, relative to static components, based at least in part upon a linear actuator mechanism using Lorentz forces, also referred to herein as a Lorentz actuator mechanism.

Description of the Related Art

For small devices, including high-end miniature cameras, it is common to configure certain components included in the devices to be movably adjusted, relative to other components. In miniature cameras, such configuration can include configuring one or more components to enable an auto-focus' (AF) function, whereby the object focal distance is adjusted to allow objects at different distances to be in sharp focus at the image plane, to be captured by a digital image sensor. There have been many proposals for achieving such adjustments of mobile components, relative to static components, including adjustment of focal position.

For example, with regard to miniature camera devices, the most common solution is to move the whole optical lens as a single rigid body along the optical axis. Positions of the lens closer to the image sensor correspond to object focal distances further from the camera. Demands on improvements to performance of such miniature cameras are constant, as are demands for continued miniaturization, given the added features and devices added to such mobile devices.

In particular, high image quality is easier to achieve if the lens motion along the optical axis is accompanied by minimal parasitic motion in the other degrees of freedom, particularly tilt about axes orthogonal to the optical axis.

Further to this, there is a strong desire, for a given size of camera, to fit bigger lenses and image sensors to improve image quality, and hence there is a desire to reduce the size of components such as actuator mechanisms. However, some small-sized components, including various components included in actuator mechanisms, can be relatively complex to assemble and can be vulnerable to failure, based at least in part upon small size and complexity of various components.

SUMMARY OF EMBODIMENTS

Some embodiments provide an actuator mechanism for controlling the motion of a mobile component relative to a static component. The actuator mechanism includes a flat coil assembly which is physically coupled to the mobile component in a magnetic field of one or more magnets and is configured to adjust a position of the mobile component, relative to the static component, based at least in part upon Lorentz forces. The flat coil assembly includes one or more conductor elements, at least partially bounded by a set of insulator elements within an interior of the flat coil assembly, which forms a coil structure, within the interior of the flat coil assembly, which is configured to generate the Lorentz forces based at least in part upon an electrical current through the one or more conductor elements.

Figure 1A:
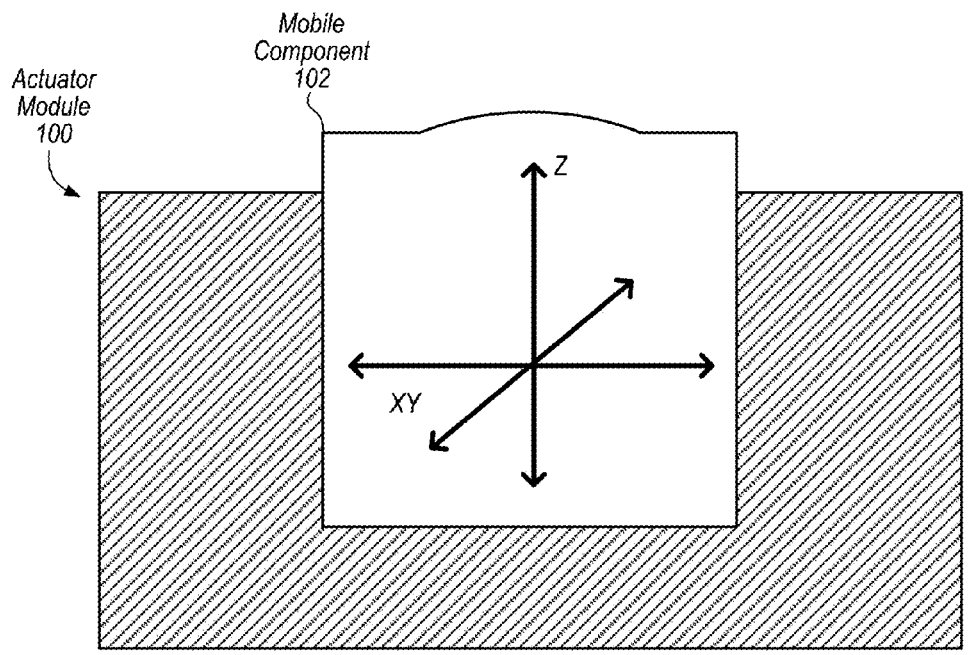
FIG. 1A-B illustrate motion of a mobile component, relative to a static component, within an actuator module, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide an apparatus for controlling the motion of a mobile component relative to a static component. The apparatus can include a linear actuator which controls the motion of the mobile component based at least in part upon Lorentz forces. Such a linear actuator can be referred to herein as an actuator mechanism. In some embodiments, at least the mobile component is included in a camera component, such that the actuator mechanism controls the motion of an optics carrier which itself includes one or more optics components, which can include one or more optical lenses, relative to one or more image sensors.

In some embodiments, an apparatus for controlling the motion of a mobile component relative to a static component, includes multiple magnets coupled to the static component and a flat coil assembly physically coupled to the mobile component in a magnetic field of one or more magnets of the plurality of magnets and electrically coupled to a power source. Each magnet of the plurality of magnets is poled with magnetic domains substantially aligned in the same direction throughout each magnet. The flat coil assembly is configured to adjust a position of the mobile component, relative to the static component, based at least in part upon Lorentz forces. The flat coil assembly includes a set of conductor elements at least partially bounded by a set of insulator elements within an interior of the flat coil assembly. The set of conductor elements form a coil structure, within the interior of the flat coil assembly, which is configured to generate the Lorentz forces based at least in part upon an electrical current through the conductor elements.

In some embodiments, the flat coil assembly includes multiple physically coupled layers which collectively establish the coil structure within the interior of the flat coil assembly. One or more of the plurality of physically coupled layers can include a particular pattern of conductor elements and insulator elements.

In some embodiments, the flat coil assembly includes one or more flat coils, where each flat coil includes a separate set of conductor elements forming a coil structure within the respective flat coil. In some embodiments, the flat coil assembly includes multiple flat coils which are each coupled to separate sides of the mobile component. In some embodiments, the flat coils are coupled to opposite sides of the mobile component. In some embodiments, the plurality of flat coils are configured to be electrically coupled to a power source in series.

In some embodiments, the mobile component includes an optics carrier included in a camera device and including an optics component, and the flat coil assembly is configured to adjust a position of the optics carrier, relative to an image sensor in the camera device along an axis parallel to the optical axis for focus adjustment. The optics component can include one or more optical lenses.

In some embodiments, the flat coil assembly is configured to be coupled to the mobile component as a monolithic component. In some embodiments, the flat coil assembly is configured to be coupled to the mobile component in an automatic process which is independent of manual intervention. Such an automatic process can be implemented by one or more robotic mechanisms which are controlled by one or more computer systems.

In some embodiments, the flat coil assembly includes a flexible electrical connection which is physically coupled to an electrical terminal to electrically couple the flat coil assembly to the power source. The flexible electrical connection is configured to flex, to maintain the electrical coupling of the flat coil assembly and the power source, as the mobile component moves, relative to the static component.

In some embodiments, an apparatus includes a Lorentz actuator mechanism configured to adjustably position a mobile component, relative to a static component, based at least in part upon Lorentz forces. The Lorentz actuator mechanism can include one or more flat coil assemblies configured to couple directly with the mobile component and generate Lorentz forces based at least in part upon an electrical current applied to the flat coil assembly. The flat coil assembly can include at least one set of conductor elements coupled in series through an interior of the one or more flat coil assemblies to collectively form a coil structure within the interior of the one or more flat coil assemblies. The coil structure is configured to generate the Lorentz forces based at least in part upon an electrical current through the conductor elements.

In some embodiments, the one or more flat coil assemblies includes a multilayer structure of multiple physically coupled layers which collectively establish the coil structure based at least in part upon the physically coupling of the layers to electrically couple the particular patterns of conductor elements. At least one layer in the plurality of layers can include a particular pattern of conductor elements and insulator elements.

In some embodiments, the one or more flat coil assemblies is configured to be coupled to the static component via one or more spring assemblies. The one or more spring assemblies can be configured to at least partially restrict a range of motion of the mobile component.

In some embodiments, the one or more flat coil assemblies includes a frame structure coupled to the mobile component assembly, and multiple flat coils coupled to opposite sides of the frame structure, such that the plurality of flat coils are positioned at opposite sides of the mobile component assembly.

In some embodiments, the one or more flat coil assemblies is configured to couple directly with the mobile component as a monolithic component.

Some embodiments include methods and systems for mobile component control. In some embodiments, a method includes assembling an actuator module including a static component and a mobile component and configured to adjust a position of the mobile component, relative to the static component, based at least in part upon Lorentz forces applied to the mobile component. Such assembling can include physically coupling a flat coil assembly to the mobile component, wherein the flat coil assembly is configured to generate Lorentz forces based at least in part upon an internal electrical current through at least one internal coil structure including at least one internal conductor element while the flat coil assembly is located in a magnetic field of one or more magnets.

In some embodiments, the flat coil assembly includes a frame structure configured to accommodate multiple flat coils on opposite sides of the frame structure, wherein each flat coil includes a separate at least one internal coil structure including at least one internal conductor element. A method can include coupling each of the plurality of flat coils to the opposite sides of the frame structure to establish the flat coil assembly. Physically coupling a flat coil assembly to the mobile component can include coupling the frame structure to the mobile component, such that each flat coil is positioned on an opposite side of the mobile component. In some embodiments, coupling each of the flat coils to the opposite sides of the frame structure to establish the flat coil assembly includes electrically coupling the plurality of flat coils together in series. In some embodiments, each flat coil included in the flat coil assembly is pre-fabricated.

In some embodiments, physically coupling a flat coil assembly to the mobile component includes coupling the flat coil assembly, to the mobile component, as a monolithic component. In some embodiments, the flat coil assembly is pre-fabricated. In some embodiments, the flat coil assembly is coupled to the mobile component independently of any manual intervention.

In some embodiments, the mobile component includes an optics carrier included in a camera device and further includes an optics component. The flat coil assembly can be configured to adjust a position of the optics carrier, relative to an image sensor in the camera device along an axis parallel to the optical axis for focus adjustment of the optics component. Such focus adjustment can include auto-focusing.

In some embodiments, the flat coil assembly includes a flexible electrical connection which is configured to flex, to maintain an electrical connection between the flat coil assembly and a power source, concurrently with the flat coil assembly generating Lorentz forces to adjust a position of the mobile component, relative to the static component.

Adjustably positioning the mobile component, relative to the static component, based at least in part upon a current applied to one or more flat coil assemblies included in one or more actuator mechanisms can be controlled, at least partially, by a non-transitory, computer-readable storage medium and one or more processors (e.g., CPUs and/or GPUs) of a computing apparatus. The computer-readable storage medium may store program instructions executable by the one or more processors to cause the computing apparatus to perform calculating an equilibrium position of the mobile component relative to one or more static components in a static component assembly, detecting a current position of the mobile component relative to the static component and calculating a displacement of the mobile component by the actuator mechanism necessary to move the mobile component to the equilibrium position, as described herein. Other embodiments of the non-uniform paint loading module may be at least partially implemented by hardware circuitry and/or firmware stored, for example, in a non-volatile memory.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Some embodiments include an actuator module for use in one or more various devices. Such devices can include one or more miniature cameras, such as those used in mobile handheld devices or other multifunction devices. For high-end miniature cameras, it is common to incorporate 'autofocus' (AF) functionality, whereby the object focal distance is adjusted to allow objects at different distances to be in sharp focus at the image plane, to be captured by the digital image sensor. Some embodiments allow improvements to performance of such miniature cameras, as well as continued miniaturization, to accommodate added features and devices added to such mobile devices.

Some embodiments include an actuator mechanism which includes one or more Lorentz actuator mechanisms. For such actuator mechanisms, a current carrying conductor element in a magnetic field experiences a force proportional to the cross product of the current applied to the conductor element and the magnetic field. This force is known as the Lorentz force. In some embodiments, the Lorentz force is greatest if the direction of the magnetic field is orthogonal to the direction of the current flow, and the resulting force on the conductor is orthogonal to both. The Lorentz force is proportional to the magnetic field density and the current through the conductor. The conductor element can be included in a coil structure, which includes a coil formed of one or more conductor elements. Some embodiments use an actuator mechanism configured to have a substantially constant magnetic field cutting the coil element for all positions of the actuator mechanism, such that the force produced is proportional to the current through the one or more conductor elements included in the coil element. In some embodiments, the actuator mechanism includes a voice coil motor (VCM), where the coil element, and the coil structure included therein, includes a voice coil formed of one or more instances of conductor elements (which can include one or more instances of conductor wiring, conductor cabling, some combination thereof, etc.) wound to form the coil structure. Some embodiments make further use of voice coil motor technology and include an actuator architecture suitable for improving power consumption, performance, reducing size, and adding extra functionality, including optical image stabilization.

Some embodiments allow a reduction in the complexity and size of components such as actuator mechanisms. Some embodiments allow assembly of an actuator module which includes a mobile component within a mobile component assembly to be simplified and streamlined, based at least in part upon the actuator mechanism including a flat coil assembly which includes a coil structure of one or more conductor elements within an interior of the flat coil assembly. The flat coil assembly can be coupled directly to the mobile component as a monolithic component, thereby simplifying assembly of the actuator mechanism, relative to an actuator mechanism which includes a voice coil motor (VCM), as winding of one or more conductor cablings to form a coil structure is precluded. In addition, as the coil structure is located within the interior of the flat coil assembly, the conductor elements are less vulnerable to exposure and damage, relative to wound conductor cabling included in a coil element of a VCM.

An apparatus for controlling motions of a mobile component relative to a static component within a device, which can include controlling motions of an optics component relative to an image sensor within a camera device, may include an actuator mechanism for controlling the position of the mobile component relative to the static component along two axes (X, Y) orthogonal to the optical (Z) axis of the device. The apparatus may be referred to herein as an actuator module. In some embodiments, a mobile component assembly that includes the mobile component and that may also include at least some components of the actuator mechanism (e.g., magnets and/or coil elements) may be suspended on one or more sets of spring assemblies, wires, beams, etc. over a base of the actuator module. Each set of spring assemblies may be substantially parallel to an axis of motion of the mobile component. In at least some embodiments, the spring assemblies are substantially perpendicular to the axis of motion of the mobile component and are capable of bending deformations that allow the mobile component assembly to move in linear directions parallel to the axis of motion (i.e., on the Z plane). Where the actuator module includes an optical component included in a camera device, the actuator mechanism may provide autofocus for the camera device, and in some embodiments may be implemented as a voice coil motor (VCM) actuator mechanism. The actuator module may, for example, be used as or in a miniature or small form factor camera suitable for small, mobile multipurpose devices such as cell phones, smartphones, and pad or tablet devices. In at least some embodiments, the actuator module may also include a focusing mechanism for moving the optics component along an optical (Z) axis within the optics assembly.

Some embodiments include a method for assembling the actuator module. In some embodiments, the method includes assembling a static component assembly for an actuator module, and assembling a mobile component assembly actuator module. In some embodiments, the mobile component assembly is configured to move within the actuator module on one or more axes orthogonal to an optical axis of an optics component. In some embodiments, the method further includes suspending the mobile component assembly by one or more sets of spring assemblies connecting to the static component assembly of the actuator module. The actuator module can include an actuator mechanism which includes one or more magnets and one or more coil elements configured to exert force on the mobile component to adjustably position the mobile component assembly, based at least in part upon Lorentz forces generated by the coil element. The coil element can include a flat coil assembly, which can include a multilayer flexible circuit assembly configured to include one or more internal conductor coil structures formed from multiple coupled layers of conductor elements bounded by insulator elements. The flat coil assembly can be a monolithic component, such that coupling the flat coil assembly to the mobile component assembly includes coupling the monolithic component to the mobile component in a single process.

Some embodiments include a camera. In some embodiments, the camera includes a static component assembly which includes a photosensor configured to capture light projected onto a surface of the photosensor. In some embodiments, the camera includes an actuator module. In some embodiments, the actuator module includes a mobile component assembly which includes an optics assembly configured to refract light from an object field located in front of the camera onto the photosensor. In some embodiments, the actuator module includes an actuator mechanism configured to move the optics assembly within the actuator module on one or more axes orthogonal to an optical axis of the camera to automatically focus an image formed by the optics assembly at the photosensor. In some embodiments, the optics assembly is suspended by one or more sets of spring assemblies on the static component assembly.

Lorentz Actuator Mechanism

Figure 1B:
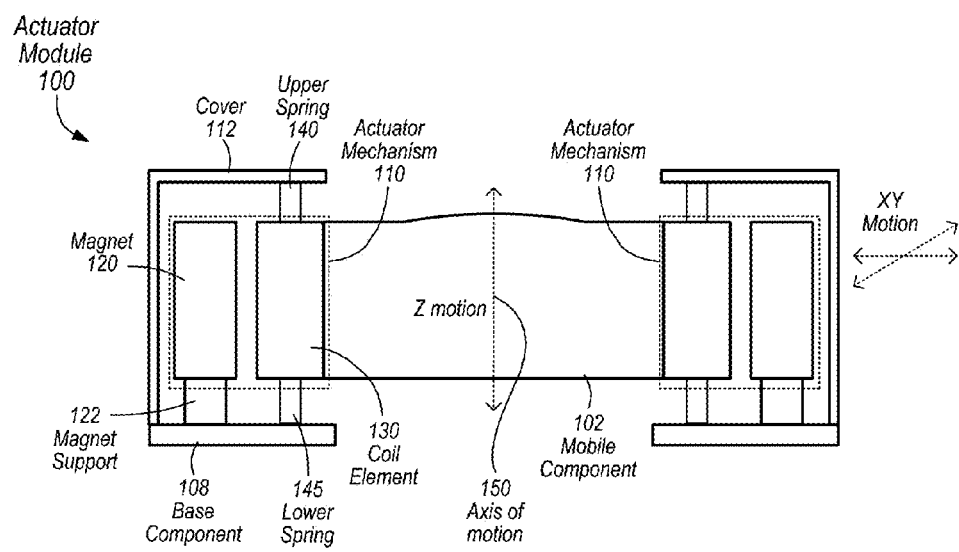

FIG. 1A and FIG. 1B illustrate motion of a mobile component 102 within an actuator module 100, according to at least some embodiments. As shown in FIG. 1A, where the mobile component 102 includes an optics component, an actuator module 100 may provide optical image autofocusing for the optics component 102. In at least some embodiments, the actuator module 100 may include a Lorentz actuator mechanism, herein referred to as an "actuator mechanism", which can include a voice coil motor (VCM) actuator mechanism, a flat coil assembly actuator mechanism, some combination thereof, etc. An actuator module 100 such as a flat coil actuator module may provide motion to mobile component 102 in the Z axis. The Z axis motion may, for example, be for optical focusing or autofocus purposes in cameras that incorporate focusing/autofocus mechanisms. Example embodiments of an optical image focusing actuator mechanism are illustrated as actuator module 700 in FIG. 7. Embodiments of the actuator module 100 may, for example, be used in a miniature or small form factor camera suitable for small, mobile multipurpose devices such as cell phones, smartphones, and pad or tablet devices, as described below with respect to FIG. 12-13.

FIG. 1B illustrates components of an example actuator module 100 that provides Z axis motions 150 for a mobile component 102 based at least in part upon Lorentz forces generated in one or more actuator mechanisms 110 included therein, according to some embodiments. In some embodiments, a mobile component 102 of the actuator module 100 may include an optics component that is coupled to an actuator mechanism 110 and is coupled to various elements of a static component assembly, including a base component 108 and a cover 112, via one or more sets of spring assemblies 140, 150.

The actuator mechanism 110 can include one or more magnets 120, coil elements 130, etc. Each magnet 120 can be poled so as to generate a magnetic field, the useful component of which for the function of moving the mobile component 102 is orthogonal to the axis 150, and orthogonal to the plane of each magnet 120 proximate to the coil element 130, and magnetic fields for all magnets 120 are all either directed towards a given coil element 130, or away from the coil element 130, so that the Lorentz forces from all magnets 120 act in the same direction along the axis of motion 150.

Where the actuator mechanism 110 includes a Lorentz actuator mechanism, a given mechanism 110 can include a coil element 130 positioned in a magnetic field generated by a magnet 120 and configured to generate Lorentz forces based at least in part upon an electrical current applied to the coil element. As shown in FIG. 1B, the coil elements 130 illustrated therein are coupled, orthogonally to axis 150, to one or more external sides, also referred to as exterior sides, of the mobile component 102 which extend in parallel to axis 150. The spring assemblies 140, 145 can be flexible to allow motion of the mobile component 102 on the Z axis 150 relative to one or more static components (e.g., base 108, cover 112, magnet 120, magnet support 122, etc.) included in a static component assembly. In the illustrated embodiment, a portion of the actuator mechanism 110, the coil element 130, is coupled to the mobile component 102 to form a mobile component assembly, and the magnet 120 can be coupled to one or more portions of the static component assembly via one or more magnet support elements 122. As a result, the actuator mechanism 110 can move the mobile component assembly on the Z axis within the actuator module 100, and relative to the static component assembly, so that the coil element 130 included in the mobile component assembly moves with the mobile component 102 and relative to the magnet 120, which remains included in, and affixed to other static components included in, the static component assembly. An actuator mechanism 110 may be configured to move the mobile component 102 on the Z axis 150 within the actuator module 100 to provide focusing or autofocus for a camera, for example where the static component assembly includes an image sensor (not shown) and the mobile component 102 includes an optics carrier which accommodates one or more optics components, including one or more optical lenses.

In some embodiments, the mobile component assembly, which can include the mobile component 102 and one or more coil elements 130 of one or more actuator mechanisms 110, is at least partially suspended within the actuator module 100 on one or more sets of spring assemblies 140, 145. For example, in the illustrated embodiment, the set of spring assemblies 145 are coupled directly to base component 108, and the set of spring assemblies 140 are coupled directly to cover 112. The spring assemblies may be flexible to allow motion of the mobile component assembly which includes the mobile component 102 and coil elements 130, on the Z axis, XY axis, some combination thereof, or the like. Where the actuator module is included in a camera device, and the mobile component 102 includes an optics component, the actuator mechanisms 110 can move the mobile component assembly, and thus the mobile component 102 on the Z axis within the actuator module 100, to provide optical image focusing for the camera device.

In this way, when an electric current is applied to one or more of the coil elements 130, Lorentz forces are developed due to the presence of the magnets 120, and a force substantially parallel to the axis 150 is generated to move the mobile component 102, and one or more components included therein, along the axis 150, relative to the various static components 108, 112, 120, 122 included in the static component assembly. In addition to suspending the mobile component assembly and substantially eliminating parasitic motions, the upper spring assemblies 140 and lower spring assemblies 145 also resist the Lorentz forces generated in coil elements 130, and hence convert the forces to a displacement of the lens. This basic architecture in FIG. 1B is typical of some embodiments.

Some embodiments further provide a drive scheme for an actuator mechanism for a miniature camera, such as may be used in a mobile handheld device or other multifunction device. Some embodiments provide a flat coil assembly actuator mechanism configuration, which uses 'fixed' magnets and a moving flat coil assembly coupled to a mobile component which includes an optics carrier that itself includes, accommodates, etc. one or more optics components. The optics carrier can include a threaded lens carrier, on which is mounted an optics component which includes one or more a threaded lens. Some embodiments further incorporate a method for assembling the actuator mechanism and a method of driving the actuator mechanism.

In some embodiments, the actuator module includes multiple separate coil elements, which can include multiple flat coils, multiple flat coil assemblies, some combination thereof, etc. Each flat coil, flat coil assembly, etc. can be located on separate sides of the mobile component and can further be accompanied by its own magnet. In order to deliver Lorentz forces in the same direction from each side of each coil, some embodiments use dual-pole magnets, where the domains in different portions of the magnet are aligned in opposite directions.

Figure 2:
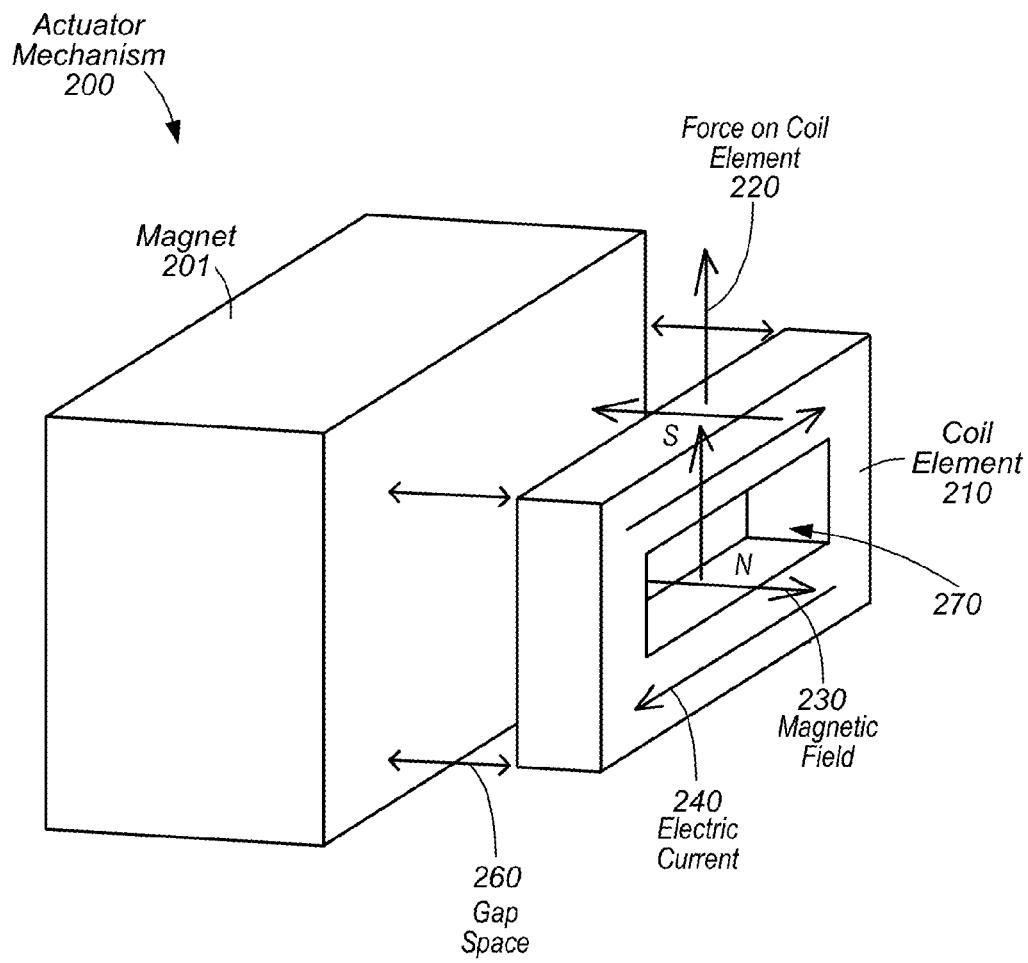
FIG. 2 illustrates a perspective view of a magnet and coil configuration of an actuator mechanism, according to some embodiments.

FIG. 2 illustrates a perspective view of a magnet and coil configuration of a Lorentz actuator mechanism, also referred to interchangeably herein as an "actuator mechanism", according to some embodiments. The actuator mechanism 200 illustrated in FIG. 2 can be included in any of the embodiments illustrated in the figures included herein. FIG. 2 illustrates how a dual-pole magnet 201 in the actuator mechanism 200 interacts, through a magnetic field 230, with the coil element 210 carrying a current 240 which is applied to the coil element 210 to produce a consistent force 220 from each magnet 201 and coil element 210 on the mobile component to which the coil element 210 is directly and physically coupled (not shown) in the direction of the generated force 220. Note that the coil element 210 is not physically affixed to the magnet 200 but is rather physically separated by a gap space 260, such that generation of the Lorentz force 220 on the coil element 210 can result in the coil element 210 moving, in the direction of the generated force 220, relative to the magnet 200. Coil element 210 can be coupled, orthogonally to the direction of force 220 and in parallel to the directions of magnetic field 230, to a mobile component.

In some embodiments, the coil element of a Lorentz actuator mechanism includes one or more instances of conductor cabling which are wound to form one or more coil assemblies of conductor elements. The coil element can be established through winding the conductor cabling into a coil around the gap space of the coil. For example, in FIG. 2, the coil element 210 which is shown to include an internal gap space 270 can include an assembly of one or more instances of conductor cabling wound around the gap space 270 into a coil structure to establish the coil element 210. The cabling can be wound into a coil structure to establish the coil element 210 before or after the cabling is attached to a mobile component. For example, the mobile component can include a protruding element (not shown) which occupies the gap space 270, and the cabling can be wound around the protruding element to establish the coil element 210. In another embodiment, the cabling can be wound into a coil structure to establish the coil element 210, and the coil element 210 can be coupled, subsequently, to one or more portions of a mobile component.

Winding one or more instances of conductor cabling to form a coil element can be a time-consuming and energy-intensive process. Winding a cabling to form the coil may be difficult to implement without manual intervention and may require relatively significant proportions of the total assembly time of an actuator module. In addition, the resultant coil element can be vulnerable to damage, through damage to the one or more wound cabling instances in the coil.

In some embodiments, a coil element can include a flat coil assembly which includes one or more flat coils which each includes a coil structure of one or more conductor elements within an interior of the flat coil assembly. The flat coil assembly can be a monolithic component which can be coupled to a mobile component in a single coupling process, thereby precluding a winding of conductors to establish the coil structure. Furthermore, as the conductor elements of the flat coil structure can be located within the interior of the structure and may not be exposed to the external environment, except potentially at two points, the conductor elements can be protected from damage from external forces, environmental elements, etc.

The flat coil assembly can be pre-fabricated as a monolithic structure. In some embodiments, the flat coil assembly is assembled from multiple layers, which each include one or more patterns of conductor elements, to establish the flat coil assembly as a multilayer structure, where the conductor elements in the various layers are electrically coupled when the layers are coupled together to form the coil structure within the interior of the formed flat coil assembly. The multilayer structure can include multiple layers coupled together to form a monolithic structure. A flat coil assembly, in some embodiments, includes a multilayer flexible circuit assembly, one or more flexible circuits, one or more rigid flexible circuit, one or more single-layer flexible circuits, some combination thereof, etc. The coil structure of conductor elements in the flat coil assembly can include opposite ends which can be electrically coupled to electrical terminals external to the flat coil assembly via one or more separate electrical connections (also referred to herein as electrical leads). The electrical connections can be included in the structure of the flat coil assembly, one or more layers thereof, etc. In some embodiments, the electrical connections are coupled to exposed conductor elements of the flat coil assembly.

Figure 3A:
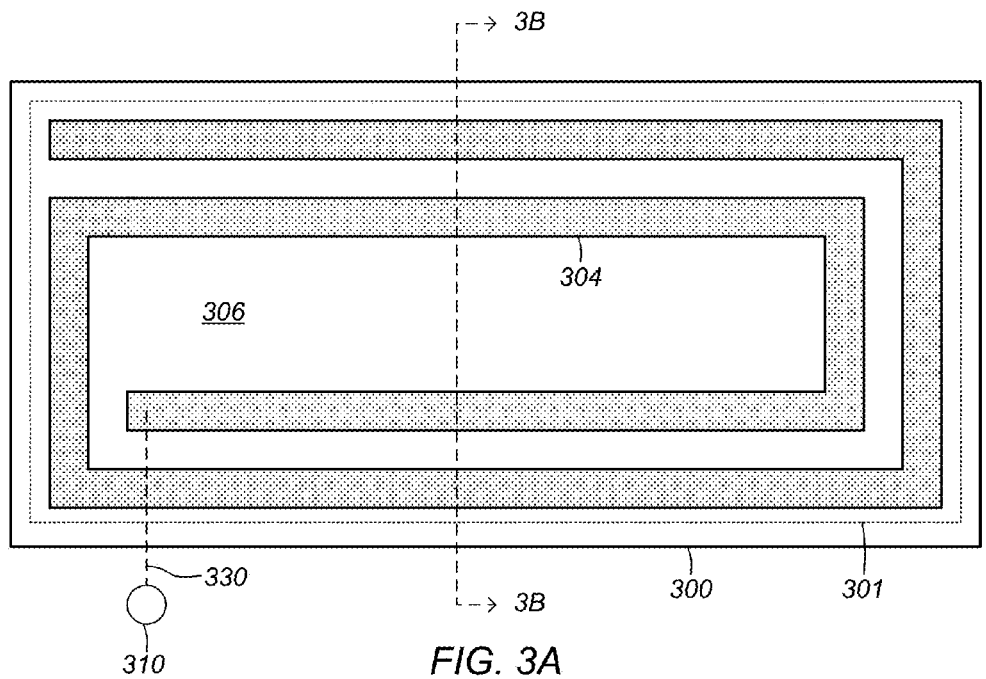
FIG. 3A-B illustrate orthogonal cross-sectional views of a flat coil assembly, according to some embodiments.
Figure 3B:
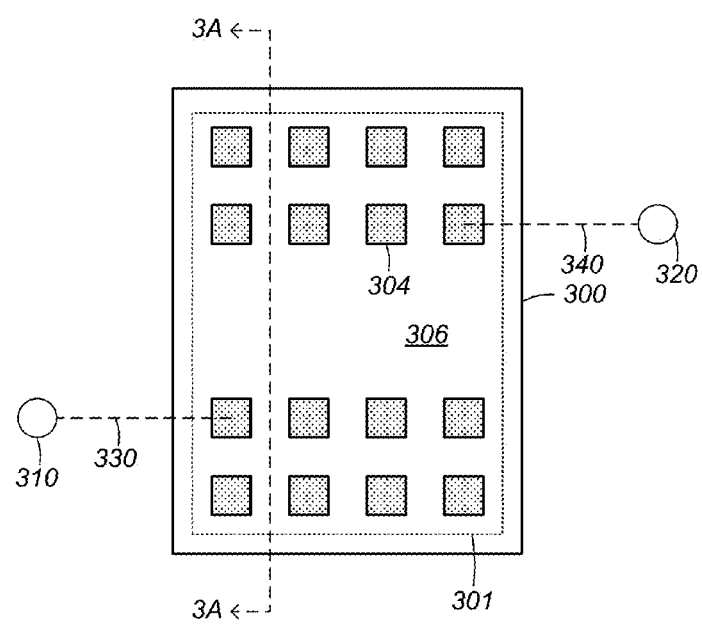

FIG. 3A-B illustrate orthogonal cross-sectional views of a flat coil assembly 500, according to some embodiments. The flat coil assembly 500 can be included in one or more elements illustrated in other figures herein, including coil element 130 in FIG. 1B, coil element 210 in FIG. 2, flat coil assembly 400 in FIG. 4, flat coil assembly 510 in FIG. 5, flat coil assembly 812 in FIG. 6, flat coil assembly 704 in FIG. 7, flat coil assembly 806 in FIG. 8A-E, some combination thereof, etc. Flat coil assembly 300 is a structure which includes internal patterns of conductor elements 304 and insulator elements 306 which establish one or more internal structures of conductor elements 304 within the interior of the flat coil assembly 300 which include a coil structure 301 at least partially bounded by insulator elements 306 and configured to be coupled to two separate electrical leads at opposite ends of the coil structure 301. A coil structure of one or more conductor elements within an interior of a flat coil assembly, as described herein, refers to a coil-shaped pathway through the interior of the flat coil assembly which is formed by one or more conductor elements.

FIG. 3A illustrates a side cross-sectional view of the flat coil assembly which illustrates a coil structure of one or more conductor elements 304 through the interior of the flat coil assembly, where the coil structure 301 of conductor elements is bounded by one or more insulator elements 306, and at least some conductor elements are separated from each other by insulator elements. Some separate conductor elements are not separated by inductor elements, such that the separate conductor elements are coupled together and are configured to pass an electrical current between the separate conductor elements. Such coupled conductor elements can be referred to as being electrically coupled. Such conductor elements which are not separated by insulator elements can form at least a portion of the coil structure 301 within the interior of the flat coil assembly 300.

FIG. 3B illustrates a front cross-sectional view of the flat coil assembly 300 which illustrates the number of coils of the coil structure 301 within the flat coil assembly 300. The coil structure 301 of conductor elements 304 can be electrically coupled, at opposite ends, to separate electrical terminals 310, 320 external to the flat coil assembly 300 to configure the flat coil assembly 300 to pass an electrical current through the conductor elements 304 included in the coil structure 301 when a current is applied to the flat coil assembly via one or more of the terminals 310, 320. In some embodiments, the flat coil assembly 300 includes separate electrical connections 330, 340 which are each coupled to separate ends of the coil structure 301 formed by the coupled conductor elements 304, where each separate connection 330, 340 is configured to be coupled with a separate electrical terminal 310, 320. Such connections 330, 340 can be coupled to the conductor elements 304 during assembly of the flat cable assembly 300, subsequent to such assembly via coupling to exposed conductor elements 304 on the exterior of the flat coil assembly 300, some combination thereof, etc. Based at least in part upon the coil structure 301 formed by the coupled conductor elements 304 within the flat coil assembly 300 interior, the flat coil assembly 300 can be configured to generate Lorentz forces when current is applied to the flat coil assembly 300, such that the current flows through the coil structure formed from the conductor elements 304, while at least the coil structure 301 is located within a magnetic field generated by one or more magnets external to the flat coil assembly 300.

Figure 4:
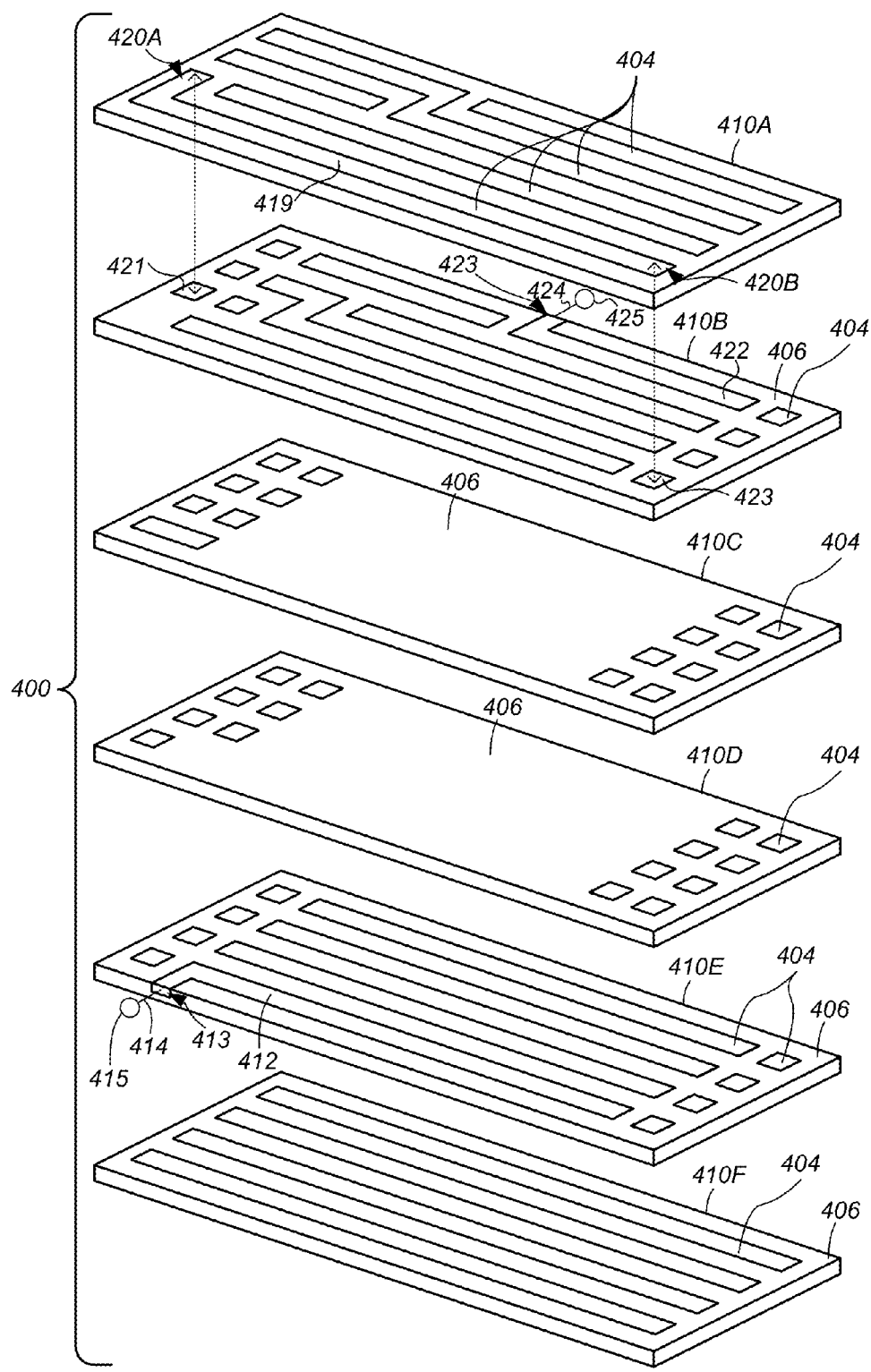
FIG. 4 illustrates a perspective exploded view of a flat coil assembly, according to some embodiments.

FIG. 4 illustrates a perspective exploded view of a flat coil assembly, according to some embodiments. The flat coil assembly 400 can be included in one or more elements illustrated in other figures herein, including coil element 130 in FIG. 1B, coil element 210 in FIG. 2, flat coil assembly 300 in FIG. 3, flat coil assembly 510 in FIG. 5, flat coil assembly 612 in FIG. 6, flat coil assembly 704 in FIG. 7, flat coil assembly 806 in FIG. 8A-E, some combination thereof, etc.

Flat coil assembly 400, in some embodiments, includes multiple separate layers 410A-F which can be coupled together to form the flat coil assembly 400. In some embodiments, each separate layer 410 includes a flexible circuit. As shown in FIG. 4, each layer 410 can include a particular pattern of conductor elements 404 and insulator elements 406. It will be understood that the processes for configuring each layer 410 to include a particular pattern of conductor elements 404 and insulator elements can include any of the known processes, including etching, casting, etc. The various layers 410A-F can be stacked as illustrated to form the flat coil assembly 400. In some embodiments, the stacked layers 410A-F are affixed together via one or more various processes, which can include an adhesive, a securing component, compression of the stacked layers, some combination thereof, etc.

As shown in the illustrated embodiment of FIG. 4, the conductor elements 404 can be patterned in each particular layer 410 so that, when the layer is coupled to one or more other particular layers, the conductor elements 404 in the separate layers can electrically couple at particular points so that the conductor element patterns in the separate layers are combined to form a composite structure of multiple coupled conductor elements. Such a composite structure can include a coil structure of conductor elements 404 within the interior of the flat coil assembly, as illustrated in FIG. 3A-B. In the illustrated embodiment, the conductor elements 404 in each of the layers 410A-F are patterned so that each individual conductor element in a given layer 410 is electrically coupled to an end of another separate conductor elements of another layer 410 when the given layer is physically coupled to one or more other layers in the illustrated coupling sequence of FIG. 4. As shown with regard to layer 410A, for example, conductor element 419 is patterned so that one end 420A of the element 419 is electrically coupled with conductor element 421 in layer 410B, and the other end 420B is electrically coupled with a separate conductor element 423 in layer 410B, when layer 410A is physically coupled with layer 410B, thereby forming a three-dimensional composite conductor structure from the coupled conductor elements 419, 421, and 423.

In the illustrated embodiment of FIG. 4, the conductor elements 404 in the layers 410A-F are patterned such that the various conductor elements 404 are electrically coupled to form a three-dimensional coil structure within the flat coil assembly 400 when the layers 410A-F are physically coupled together in the illustrated order (e.g., layer 410A is directly physically coupled to layer 410B alone, layer 410B is directly physically coupled to layer 410A on one side and layer 410C on an opposite side, etc.). The coil structure formed from the illustrated layers 410A-F resembles the coil structure 301 illustrated in FIG. 3A-B. The insulator elements 406 included in the various layers enable the coil structure formed from the coupled conductor elements 404 to insulate various portions of the conductor elements from each other, particularly insulating various conductor elements 404 located on a common layer 410, thereby facilitating the coil structure of the flat coil assembly which is configured to direct an electrical current through the interior of the flat coil assembly 400 in a coil-shaped pathway through the interior of the flat coil assembly.

In some embodiments, at least some of the conductor elements 404 in a given layer extend partially through the layer, such that one or more insulator elements 406 separates at least a portion of one or more conductor elements 404 from a particular exterior surface of the given layer. For example, in the illustrated embodiment of FIG. 4, each layer 410 can include a pattern of conductor elements 404 which extend at least partially through the depth of the given layer 410 from an upper surface of the given layer, while one or more insulator elements separate the pattern of conductor elements 404 from a lower surface of the given layer. In some embodiments, at least a portion of one or more conductor elements 404 in a given layer 410 extend fully between opposite surfaces of the given layer 410. For example, ends 420A-B of conductor element 419 may extend to the lower surface of layer 410A, enabling the element 419 to be electrically coupled with elements 421, 423 when layers 410A-B are physically coupled, while a remainder portion of conductor element 419 may extend partially between the upper and lower surfaces of layer 410, so that the remainder portion of conductor element 419 is precluded, by one or more insulator elements 406 in layer 410A, from physically contacting any conductor elements 404 included in layer 410B when layers 410A-B are physically coupled together. In another example, each of the conductor elements 404 in layer 410D can extend fully between the upper and lower surfaces of layer 410D.

In some embodiments, one or more stacked layers 410 included in a multilayer flat coil assembly 400 includes a pattern of conductor elements 404 which extend fully between opposite surfaces of the given layer. In such embodiments, at least some overlapping conductor element patterns on separate stacked layers 410 are separated from each other, thereby precluding direct electrical coupling of the overlapping conductor elements, by insulator elements 406 included in one or more layers 410 located between the separate layers which include one or more of the overlapping conductor element patterns. For example, in the illustrated embodiment, insulator elements 406 in layers 410C-D separate at least some overlapping conductor elements 404 in layers 410B, 410E from being directly electrically coupled when the layers 410B-E are stacked as illustrated.

As shown in FIG. 4, the flat coil assembly 400 includes two separate conductor elements 412 and 422, in layers 410B and 410D, which extend to a side edge of the respective layer, such that each conductor element includes a respective end 413, 423 which is configured to be electrically coupled to a respective and separate electrical connection 414, 424 which is configured to electrically couple the respective conductor element 412, 422 to a separate electrical terminal 415, 422 which is external to the flat coil assembly 400. Each conductor element end 413, 423 can form one of opposite ends of a coil structure within flat coil assembly 400 when layers 410A-F are coupled together, so that electrically coupling elements 412, 414 to electrical connections can configure the flat coil assembly 400 to enable a current to pass through the coil structure of conductor elements 404 in the interior of the flat coil assembly 400 based at least in part upon the electrical connections 414, 424. For example, as shown in the illustrated embodiment, flat coil assembly 400 can be configured to enable a current applied to the flat coil assembly 400, via electrical terminals 415 and 425, to pass from an electrical terminal 415 and coupled connection 414 to conductor element end 413, and through the coil structure formed by the coupled conductor elements 404 in the coupled layers 410A-F including the flat coil assembly, to the conductor element end 423 to pass through another electrical connection 424 to electrical terminal 425.

In some embodiments, the flat coil assembly 400 illustrated in FIG. 4 is assembled, via coupling of the separate layers 410A-F together as shown, prior to the flat coil assembly 400 being received for coupling to a mobile component as shown in FIG. 1B. As a result, the flat coil assembly can be received as a monolithic component, and coupling the flat coil assembly 400 to a mobile component can include a single coupling process to couple the flat coil assembly 400 to one or more exterior portions of the mobile component, and coupling one or more electrical connections 414, 424 to one or more electrical terminals 415, 425 external to the flat coil assembly 400 to configure the flat coil assembly to generate Lorentz forces based at least in part upon a current applied to the flat coil assembly which passes through the coil structure of conductor elements 404 within the interior of the flat coil assembly 400. In some embodiments, the flat coil assembly layers 410 are received separately, and coupling the flat coil assembly 400 to a mobile component includes coupling one or more of the layers 410 to the mobile component and subsequently coupling the remaining layers 410 to the one or more layers 410 to establish the flat coil assembly while concurrently coupling the flat coil assembly 400 to the mobile component. The electrical connections 414, 424 can be coupled to electrical terminals 415, 425 prior to, concurrently with, or subsequently to coupling the respective layers 410E, 410B to one or more other layers 410 to at least partially form the flat coil assembly.

As shown in FIG. 4, the layers 410A-F can each extend in parallel to a direction of coiling of the coil structure formed from the coupling of conductor elements included in the various layers 410A-F. As a result, coupling multiple layers 410A-F in a particular axis can result in a flat coil assembly 400, formed of the multiple layers 410, which includes an internal coil structure which coils in a direction orthogonal to the axis. For example, the coil structure formed from the coupling of layers 410 can coil from an end of the assembly 400 which includes conductor element end 413 to an opposite end of the assembly 400 which includes conductor element end 423. In some embodiments, the layers 410A-F can each extend orthogonally to the direction of coiling of the coil structure.

Figure 5:
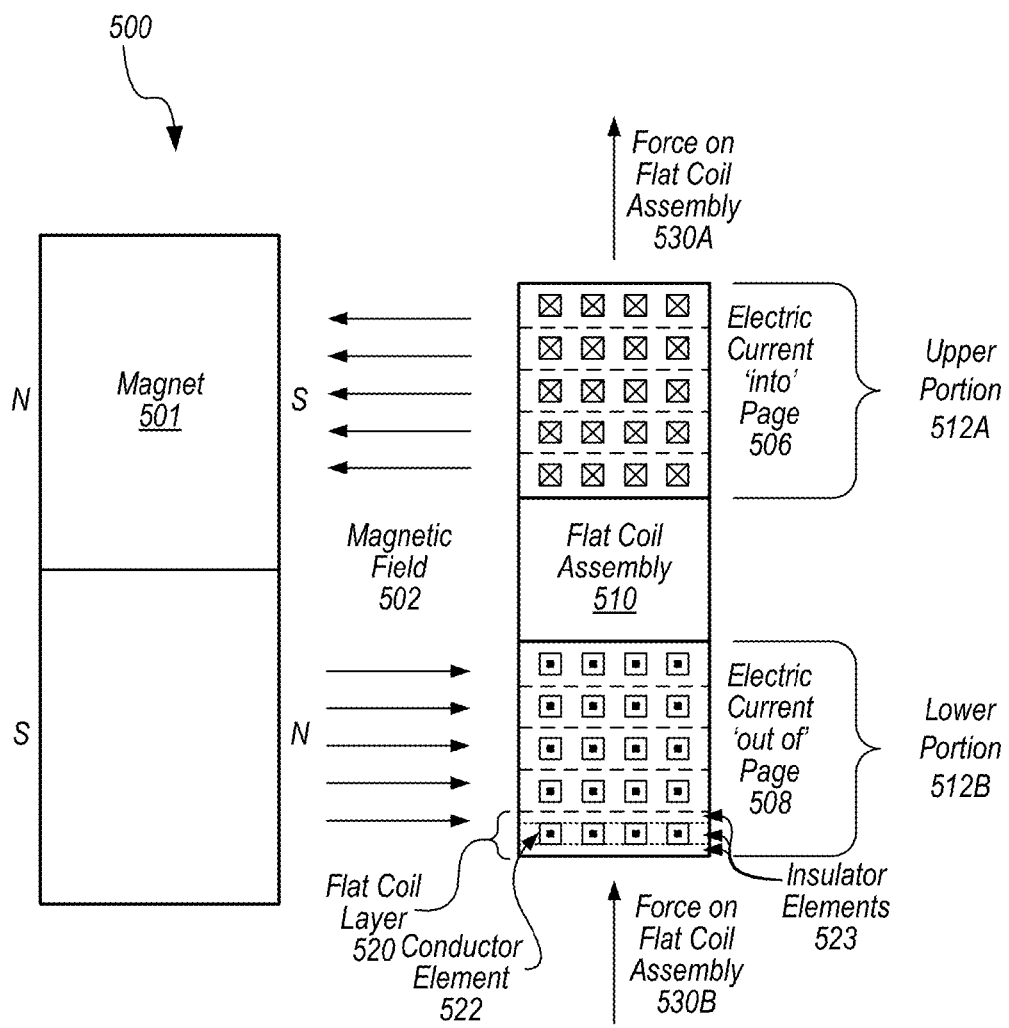
FIG. 5 illustrates a schematic of a magnet and flat coil assembly configuration, according to some embodiments.

FIG. 5 illustrates a schematic of an actuator mechanism 500 which includes a magnet 501 and flat coil assembly 510 configuration, according to some embodiments. The flat coil assembly 500 can be included in one or more elements illustrated in other figures herein, including coil element 130 in FIG. 1B, coil element 210 in FIG. 2, flat coil assembly 300 in FIG. 3, flat coil assembly 400 in FIG. 4, flat coil assembly 612 in FIG. 6, flat coil assembly 704 in FIG. 7, flat coil assembly 806 in FIG. 8A-E, some combination thereof, etc. A magnet 501 and accompanying magnetic field 502 are shown in conjunction with a flat coil assembly 510. As shown, flat coil assembly 510 includes multiple layers 520, wherein at least some layers 520 include a pattern of conductor elements 522 and insulator elements 523. One or more such layers 520 can include one or more flexible circuits. The various layers 520 can be combined to form the overall flat coil assembly 510, such that the flat coil assembly 510 includes an internal structure of conductor elements 522 formed by the combination of conductor elements 522 of the various layers 520.

As shown, the various layers 520 of the flat coil assembly 520 include two separate portions 512A-B of the flat coil assembly. Based at least in part upon the magnetic field 502 generated by magnet 501, electric current applied to flat coil assembly 510 can result in the generation of Lorentz forces 530A-B, which can result in force being applied to various components coupled to the flat coil assembly 510. As shown, the directions of electric current through the conductor elements 522 in the separate portions 512A-B are opposite, such that the electric current through the conductor elements in the layers 520 in the upper portion 512A is directed "into" the page of the drawing, and the electric current through the conductor elements 522 in the layers 520 in the lower portion 512B is directed "out of" the page of the drawing. The flat coil assembly 510 illustrated in FIG. 5 can be a cross-section illustration of a flat coil assembly 300 illustrated in FIG. 3A-B and FIG. 4, where various conductor elements 522 in various separate layers 520 are electrically coupled together when the layers are physically coupled together to form the flat coil assembly 510, so that the conductor elements 522 in the multiple combined layers of the flat coil assembly 510 form one or more internal coil structures of conductor elements in the interior of the flat coil assembly 510, where the internal coil structures are bounded by various insulator elements 523.

Figure 6A:
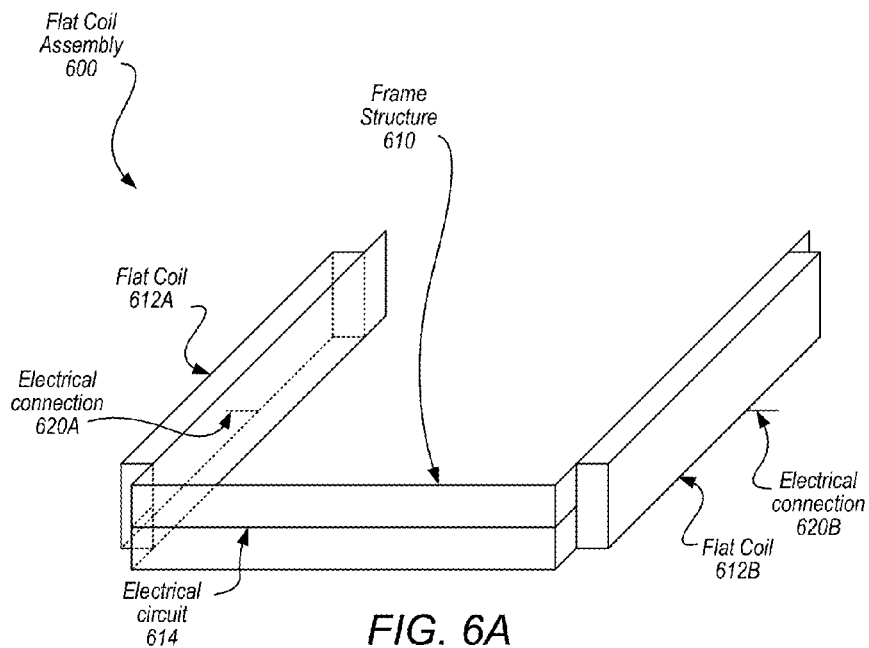
FIG. 6A-B illustrate a perspective view of a flat coil assembly which includes multiple flat coils coupled to a frame structure, which can be coupled to a mobile component, according to some embodiments.
Figure 6B:
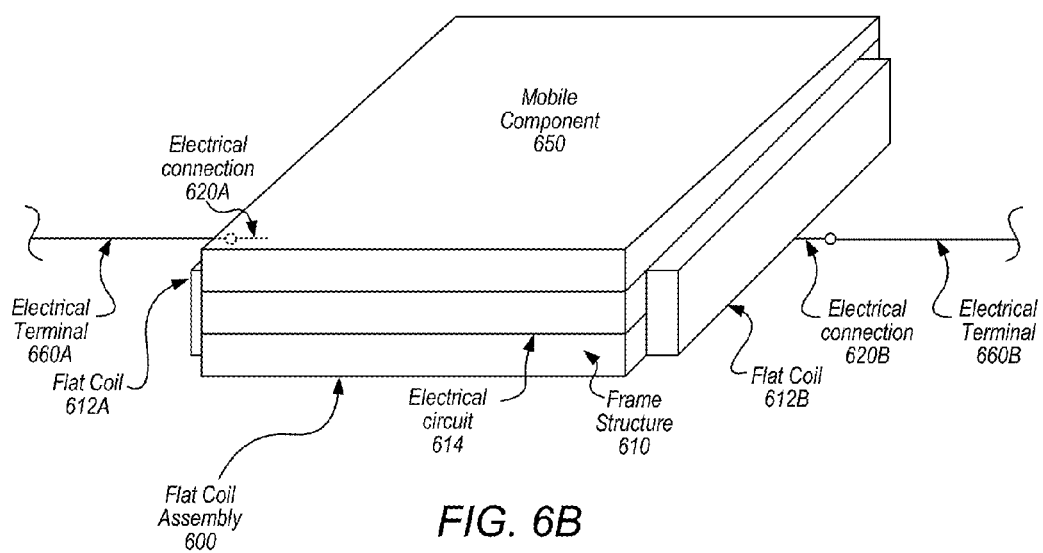

FIG. 6A-B illustrate a perspective view of a flat coil assembly which includes multiple flat coils coupled to a frame structure, which can be coupled to a mobile component, according to some embodiments. The flat coil assembly 600 can include one or more flat coils 612 which each can be included in one or more elements illustrated in other figures herein, including coil element 130 in FIG. 1B, coil element 210 in FIG. 2, flat coil assembly 300 in FIG. 3, flat coil assembly 400 in FIG. 4, flat coil assembly 510 in FIG. 5, flat coil assembly 704 in FIG. 7, flat coil assembly 806 in FIG. 8A-E, some combination thereof, etc.

In some embodiments, a flat coil assembly can include multiple separate flat coils, each of which can include a separate internal coil structure formed of separate sets of one or more conductor elements, which are coupled to various portions of a frame structure. The frame structure can be coupled to a mobile component, so that the multiple flat coils are positioned around the mobile component to which the frame structure is coupled. In addition, the flat coils can be electrically coupled to one or more power sources, in series with each other, in parallel, some combination thereof, etc.

FIG. 6A illustrates a flat coil assembly 600 which includes a frame structure 610 to which multiple separate flat coils 612A-B are physically coupled. As shown, the separate flat coils 612A-B are physically coupled to opposite sides of the frame structure 610. In addition, in the illustrated embodiment, the two flat coils 612A-B are electrically coupled in series via an electrical circuit 614, such that the flat coils 612A-B are electrically coupled in series. One flat coil 612A includes an electrical connection 620A projecting from the flat coil 612A, and flat coil 612B includes an electrical connection 620B, where the electrical leads 620A-B re each configured to electrically couple with separate electrical terminals to electrically couple the flat coils 612A-B to the terminals in series. Each of the electrical connections 620A-B can include one or more sets of flexible electrical connections.

As shown, the frame structure 610 is structured to at least partially enclose one or more exterior sides of a mobile component 650. FIG. 6B illustrates flat coil assembly 600 which is physically coupled to a mobile component 650 and electrically coupled to electrical terminals 660A-B. As shown, the flat coil assembly 600 can be physically attached to the mobile component 650, on a set of exterior sides which approximate the shape of the frame structure 610, so that the flat coils 612A-B coupled to the frame structure 610 are positioned in a particular arrangement relative to the mobile component 650. In the illustrated embodiment, as the separate flat coils 612A-B are coupled to opposite sides of the frame structure 610, coupling the frame structure 610 to the mobile component 650 can result in the separate flat coils 612A-B being positioned proximate to opposite sides of the mobile component 650.

In the illustrated embodiment, each of the electrical connections 620A-B are coupled to separate electrical terminals 660A-B, which can electrically couple the flat coils 612A-B, in series with each other via circuit 614, to a power source electrically coupled to the terminals 660A-B. In some embodiments, the terminal 660A-B are each affixed to one or more separate portions of a static component assembly (not shown in FIG. 6B), and one or more of the electrical connections 620A-B includes a flexible electrical connection which is configured to flex as the mobile component 650 and coupled flat coil assembly 600 move relative to the static component assembly.

Figure 7:
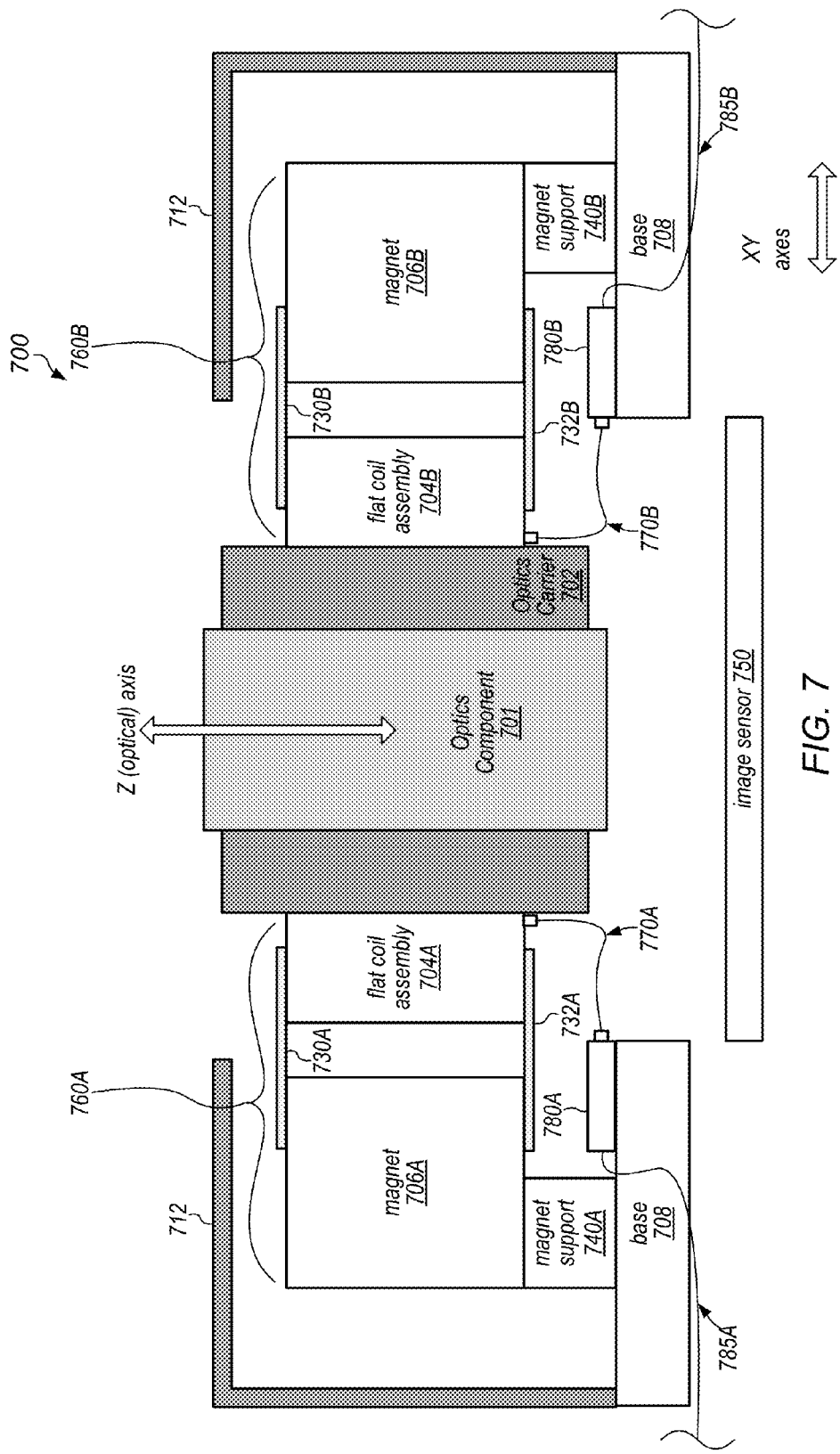
FIG. 7 illustrates a side view of an example actuator module included in a camera component and configured to adjust a mobile component which includes a lens carrier along an optical axis relative to an image sensor, according to some embodiments.

FIG. 7 illustrates a side view of an example actuator module included in a camera component and configured to adjust a mobile component which includes a lens carrier along an optical axis relative to an image sensor, according to some embodiments. The actuator module 700 can be included in the actuator module 100 illustrated in FIG. 1A-B. The flat coil assemblies 704A-B illustrated in FIG. 7 can include one or more of the flat coil assemblies illustrated in FIG. 2-6, 10.

Actuator module 700 includes a base assembly 708, magnets 706A-B, cover 712, and support elements 740A-B which collectively include a static component assembly. Image sensor 750 can be included in the static component assembly. The actuator module 700 also include an optics carrier 702 which is configured to accommodate one or more optics components 701 and includes the mobile component of the actuator module. The optics carrier 702, along with the included optics component 701, and the flat coil assemblies at least partially include the mobile component assembly of the actuator module 700. The optics carrier can include a threaded optical lens carrier, and the optics component 701 can include one or more optical lenses mounted in the carrier. The actuator module 700 can include at least two separate actuator mechanisms 760A-B which each include a separate set of magnets 706 and corresponding flat coil assemblies 704 coupled thereto via one or more spring assemblies 730, 732.

Each flat coil assembly 704A-B is electrically coupled to one or more power source connections 785A-B via a respective electrical terminal 780A-B which is included in the static component assembly of the actuator module 700. Each respective flat coil assembly 704A-B is electrically coupled to a respective electrical terminal 780A-B via a respective electrical connection 770A-B. In some embodiments, one or more electrical connections 770A-B include a flexible electrical connection which is configured to flex, as the mobile component assembly which includes the flat coil assemblies 704A-B moves along the Z axis, to maintain the electrical connection between the coupled flat coil assembly 704 and electrical terminal 780. In some embodiments, the flat coil assemblies 704A-B are electrically coupled together via an electrical circuit (not shown in FIG. 7), and each power source connection 785A-B is coupled to a common power source, such that the flat coil assemblies 704A-B are coupled to the common power source in series. In some embodiments, the flat coil assemblies 704A-B are each coupled to one or more power sources in parallel.

In the illustrated embodiment, the actuator mechanisms 760 included in the actuator modules are configured to adjustably position the optics carrier along the optical axis to perform auto-focusing of the optics component 701 included in the optics carrier 702, relative to the image sensor 750. Such adjustably positioning can include inducing a current in one or more of the flat coil assemblies 704A-B, via the electrical terminals 780A-B, such that the one or more flat coil assemblies 704A-B generate Lorentz forces, based at least in part upon the applied current and the magnetic field generated by one or more of the magnets 906A-B. The generated Lorentz forces are applied to the optics carrier 702, thereby causing the optics carrier 702 to be moved along the optical axis to one or more particular positions. The particular position to which the optics carrier is adjustably moved along the optical axis is based at least in part upon the current applied to the one or more flat coil assemblies 704A-B.

As shown, spring assemblies 730A-B, 732A-B couple the flat coil assemblies 704A-B to corresponding magnets 706A-B. The spring assemblies exert spring forces on the mobile component assembly, via exerting spring forces upon the flat coil assemblies 704A-B, as the mobile component assembly moves relative to the static component assembly which includes the magnets 706A-B. As a result, the range of motion of the mobile component assembly is at least partially restricted, and the spring assemblies are configured to return the mobile component assembly to a particular equilibrium position, relative to at least the image sensor 750, upon an absence of current through the flat coil assemblies 704A-B, and thus Lorentz forces generated by same.

Manufacturing, Process Control, and Automation Methods

FIG. 8A-E graphically illustrate an example manufacturing process for an actuator module 800 which includes a flat coil assembly, according to some embodiments, and is not intended to be limiting. The process is shown at a high level, with five major stages or steps shown in FIG. 8A through 8E. FIG. 9 is a flowchart of a method for manufacturing an actuator module 800 which includes a flat coil assembly, according to some embodiments. The actuator module 800 can be included in any of the actuator modules illustrated in any of the figures included herein, and the flat coil assemblies 806A-B illustrated in FIG. 8 can include any of the flat coil assemblies, flat coils, coil elements, etc., illustrated in any of the figured included herein.

Figure 8A:
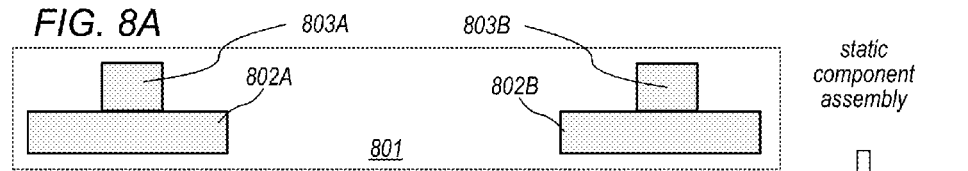
FIG. 8A-E graphically illustrate an example manufacturing process for an actuator module, according to some embodiments.
Figure 9:
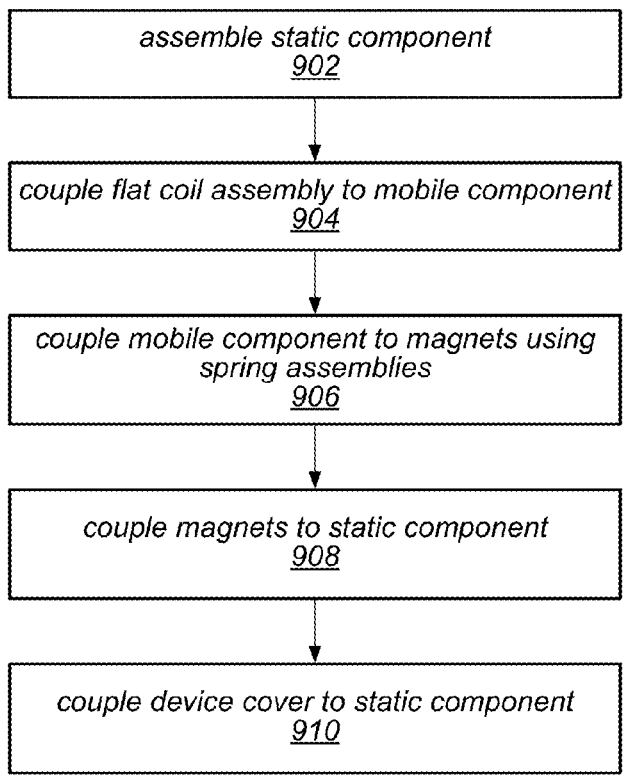
FIG. 9 is a flowchart of a method for manufacturing an actuator module which includes a flat coil assembly, according to some embodiments.

As shown in FIG. 8A and at 902 of FIG. 9, a static component 801 for an actuator module 900 is at least partially assembled. As shown, a static component can include an assembly of one or more base elements 802A-B and one or more support elements 803A-B to at least partially establish the static component 801.

Figure 8B:
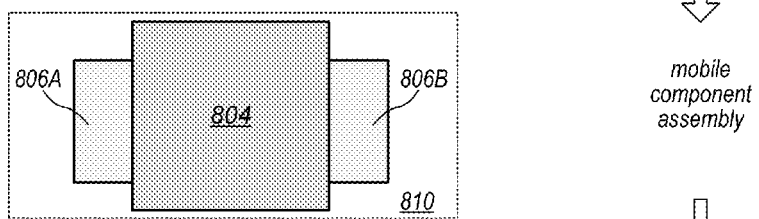

As shown in FIG. 8B and at 904 of FIG. 9, the mobile component assembly 810 is assembled. An example mobile component assembly 900 is shown in FIG. 1B. The mobile component assembly includes a mobile component 804 and flat coil assemblies 806A-B. Example flat coil assemblies are shown in FIG. 6A-B and FIG. 7. In some embodiments, assembly of the mobile component assembly 810 includes coupling the flat coil assemblies 806A-B to one or more portions of the mobile component 804. As noted above, each flat coil assembly can be a monolithic component which includes one or more internal conductor coil structures, such that coupling a flat coil assembly 806 to the mobile component 804 includes coupling the assembly 806 as a monolithic component in a single coupling process. Such a coupling process can include attaching the monolithic flat coil assembly to the mobile component via one or more adhesive elements between the flat coil assembly and the mobile component; attaching the monolithic flat coil assembly to the mobile component via one or more securing elements which secure the flat coil assembly against an exterior portion of the mobile component 804, some combination thereof, etc. An exterior portion of a module component can include at least a portion of an exterior side of the mobile component. In some embodiments, where a flat coil assembly is received in individual layers, coupling the flat coil assembly to a mobile component can include coupling one or more of the layers to the mobile component and coupling successive layers together on the first coupled one or more layers, to assembly the flat coil assembly from the multiple layers. In some embodiments, the coupling of one or more flat coil assemblies to the mobile component can be performed automatically, which can include coupling the flat coil assemblies to the mobile component to form the mobile component assembly without any manual intervention. Thus, the flat coil assembly can be coupled to the mobile component via operation of one or more computer-controller robotic systems.

Figure 8C:
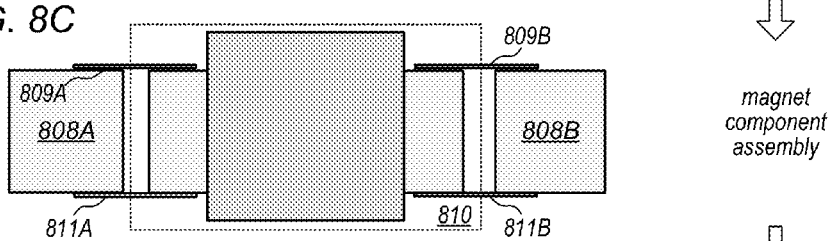

As shown in FIG. 8C and at 906 of FIG. 9, the mobile component assembly 810 can be coupled to one or more sets of magnets 808A-B, via one or more spring assemblies 809A-B, 811A-B, such that the mobile component assembly 810 is suspended from the one or more sets of magnets 808A-B via the one or more spring assemblies 809A-B, 811A-B. The spring assemblies 809A-B, 811A-B can enable the mobile component assembly 810 to move, in one or more axes, within a certain range of positions, based at least in part upon spring forces exerted by the spring assemblies, relative to at least the one or more sets of magnets 808A-B. In at least some embodiments, including the embodiment illustrated in FIG. 1B, the spring assemblies couple the mobile component assembly directly to one or more base or cover elements of the static component, such that the mobile component assembly and one or more sets of magnets are not directly coupled to each other via the one or more sets of spring assemblies. In such embodiments, the process illustrated in FIG. 8C and 906 of FIG. 9 may be absent, and the process illustrated in FIG. 8A and 902 of FIG. 9 may additionally include coupling the one or more sets of magnets 808A-B to the support elements 803A-B of the static component assembly 801. Note that the manufacturing steps represented in FIG. 8A and FIG. 8B-C, and at 902 and 904-1006 of FIG. 9 may be performed substantially in parallel, e.g. on separate production lines that merge at FIG. 8D.

Figure 8D:
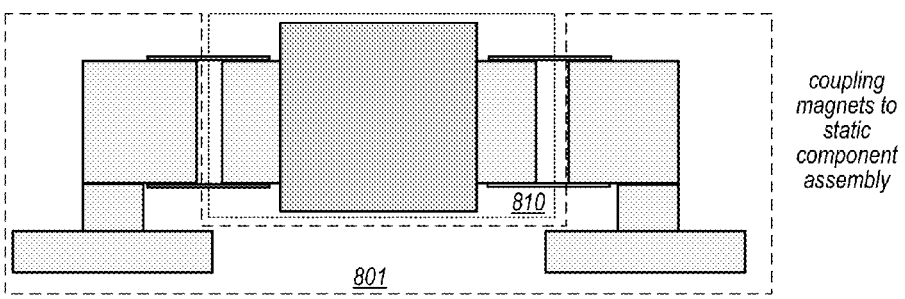

As shown in FIG. 8D and at 908 of FIG. 9, the one or more sets of magnets 808A-B are coupled to the support elements 803A-B of the static component assembly 801 to incorporate the magnets 808A-B into the static component assembly 801, such that the mobile component assembly 810 is coupled to the static component assembly 801 via the one or more sets of spring assemblies. As noted above, in some embodiments where the mobile component assembly is coupled to various elements of the static component assembly other than the magnets, including the base element, the process in FIG. 8D and 908 of FIG. 9 can include directly coupling the mobile component to one or more of the base elements 802A-B via one or more sets of spring assemblies.

Figure 8E:
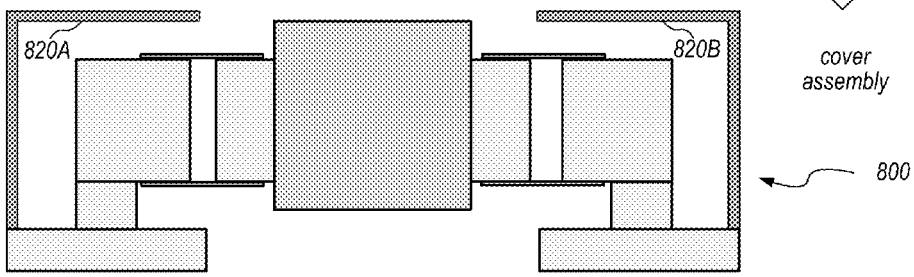

As shown in FIG. 8E and at 910 of FIG. 9, one or more cover elements 820A-B (e.g., a cover 912 with an opening for at least the optical lens 902 as shown in FIG. 9) may be attached to the one or more base elements 802A-B of the static component assembly, thereby incorporating the cover elements 820A-B into the static component assembly 801, substantially enclosing the mobile component assembly 810 in an enclosure. In some embodiments, where the process illustrated in FIG. 8A-E and FIG. 9 is a process of manufacturing the actuator module 900 illustrated in FIG. 9, the process illustrated in FIG. 8E and in 910 of FIG. 9 can result in cover elements 820A-B substantially enclosing the mobile component assembly, which includes the optical carrier 902, optical lens 901, and flat coil assemblies 904, while leaving an aperture to allow light from an object field in front of the actuator module 900 to reach the optical lens 901 and leaving an opening in base assembly 908 to allow light refracted from the optical lens 901 to reach the image sensor 950. The cover 912, magnets 906, base support 904, and base assembly 908 form the static component assembly of the actuator module 900, while the optical carrier 902, optical lens 901, and flat coil assemblies 904 for the mobile component assembly of the actuator module 900.

Figure 10:
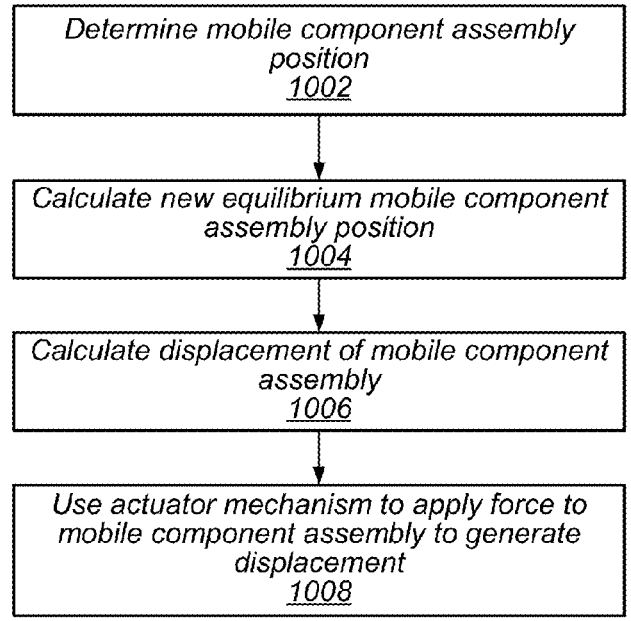
FIG. 10 is a flowchart of a method for using an actuator module to manage a position of the mobile component, relative to a static component, in an actuator module, according to some embodiments.

FIG. 10 is a flowchart of a method for using an actuator module to manage a position of the mobile component, relative to a static component, in an actuator module, according to some embodiments. At 1002, a current position of the mobile component assembly relative to the static component assembly is determined. At 1004, an equilibrium position of the mobile component assembly relative to one or more other components, which can include one or more portions of the static component assembly, is calculated, such that the equilibrium position of the mobile component assembly relative to the static component assembly is a position of the mobile component assembly, relative to the static component assembly, at which displacement of the mobile component assembly due to spring assemblies in the actuator module offsets displacement of the mobile component assembly due to gravity. At 1006, a displacement of the mobile component assembly by the actuator mechanism necessary to move the mobile component assembly to the equilibrium position is calculated. At 1008, using a motor in the actuator mechanism, force is applied to the mobile component assembly to generate the displacement.

Multifunction Device Examples

Embodiments of electronic devices in which embodiments of actuator modules 100 as described herein may be used, user interfaces for such devices, and associated processes for using such devices are described. As noted above, in some embodiments, an actuator module 100 is included in an actuator module 700 which is included in a camera device, a device which includes a camera device, etc. In some embodiments, the device is a portable communications device, such as a mobile telephone, that also contains other functions, such as PDA and/or music player functions. Other portable electronic devices, such as laptops, cell phones, pad devices, or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera device.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 11:
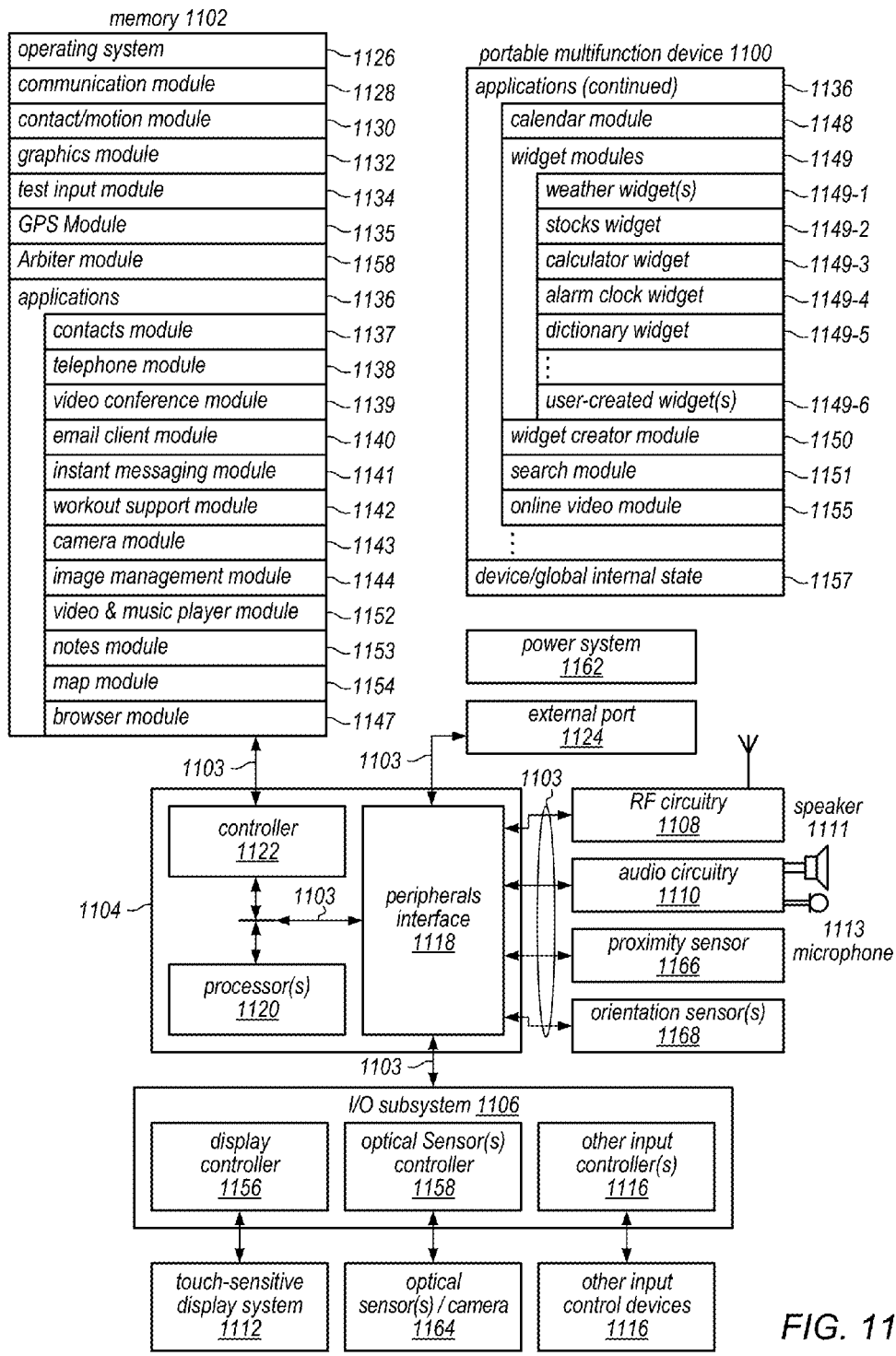
FIG. 11 illustrates a block diagram of a portable multifunction device with a camera, according to some embodiments.

Attention is now directed toward embodiments of portable devices with cameras. FIG. 11 is a block diagram illustrating portable multifunction device 1100 with camera 1164 in accordance with some embodiments. Camera 1164 is sometimes called an "optical sensor" for convenience, and may also be known as or called an optical sensor system. Embodiments of an actuator module 100, 700, etc., including one or more actuator modules that includes passive damping for auto-focusing, may be used in the optical sensor/camera(s) 1164 of a device 1100.

Device 1100 may include memory 1102 (which may include one or more computer readable storage mediums), memory controller 1122, one or more processing units (CPU's) 1120, peripherals interface 1118, RF circuitry 1108, audio circuitry 1110, speaker 1111, touch-sensitive display system 1112, microphone 1113, input/output (I/O) subsystem 1106, other input or control devices 1116, and external port 1124. Device 1100 may include one or more optical sensors 1164. These components may communicate over one or more communication buses or signal lines 1103.

It should be appreciated that device 1100 is only one example of a portable multifunction device, and that device 1100 may have more or fewer components than shown, may combine two or more components, or may have a different configuration or arrangement of the components. The various components shown in FIG. 11 may be implemented in hardware, software, or a combination of hardware and software, including one or more signal processing and/or application specific integrated circuits.

Memory 1102 may include high-speed random access memory and may also include non-volatile memory, such as one or more magnetic disk storage devices, flash memory devices, or other non-volatile solid-state memory devices. Access to memory 1102 by other components of device 1100, such as CPU 1120 and the peripherals interface 1118, may be controlled by memory controller 1122.

Peripherals interface 1118 can be used to couple input and output peripherals of the device to CPU 1120 and memory 1102. The one or more processors 1120 run or execute various software programs and/or sets of instructions stored in memory 1102 to perform various functions for device 1100 and to process data.

In some embodiments, peripherals interface 1118, CPU 1120, and memory controller 1122 may be implemented on a single chip, such as chip 1104. In some other embodiments, they may be implemented on separate chips.

RF (radio frequency) circuitry 1108 receives and sends RF signals, also called electromagnetic signals. RF circuitry 1108 converts electrical signals to/from electromagnetic signals and communicates with communications networks and other communications devices via the electromagnetic signals. RF circuitry 1108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1110, speaker 1111, and microphone 1113 provide an audio interface between a user and device 1100. Audio circuitry 1110 receives audio data from peripherals interface 1118, converts the audio data to an electrical signal, and transmits the electrical signal to speaker 1111. Speaker 1111 converts the electrical signal to human-audible sound waves. Audio circuitry 1110 also receives electrical signals converted by microphone 1113 from sound waves. Audio circuitry 1110 converts the electrical signal to audio data and transmits the audio data to peripherals interface 1118 for processing. Audio data may be retrieved from and/or transmitted to memory 102 and/or RF circuitry 1108 by peripherals interface 1118. In some embodiments, audio circuitry 1110 also includes a headset jack (e.g., 1112, FIG. 11). The headset jack provides an interface between audio circuitry 1110 and removable audio input/output peripherals, such as output-only headphones or a headset with both output (e.g., a headphone for one or both ears) and input (e.g., a microphone).

I/O subsystem 1106 couples input/output peripherals on device 1100, such as touch screen 1112 and other input control devices 1116, to peripherals interface 1118. I/O subsystem 1106 may include display controller 1156 and one or more input controllers 1160 for other input or control devices. The one or more input controllers 160 receive/send electrical signals from/to other input or control devices 1116. The other input control devices 1116 may include physical buttons (e.g., push buttons, rocker buttons, etc.), dials, slider switches, joysticks, click wheels, and so forth. In some alternative embodiments, input controller(s) 1160 may be coupled to any (or none) of the following: a keyboard, infrared port, USB port, and a pointer device such as a mouse. The one or more buttons (e.g., 1108, FIG. 11) may include an up/down button for volume control of speaker 1111 and/or microphone 1113. The one or more buttons may include a push button (e.g., 1106, FIG. 11).

Touch-sensitive display 1112 provides an input interface and an output interface between the device and a user. Display controller 1156 receives and/or sends electrical signals from/to touch screen 1112. Touch screen 1112 displays visual output to the user. The visual output may include graphics, text, icons, video, and any combination thereof (collectively termed "graphics"). In some embodiments, some or all of the visual output may correspond to user-interface objects.

Touch screen 1112 has a touch-sensitive surface, sensor or set of sensors that accepts input from the user based on haptic and/or tactile contact. Touch screen 1112 and display controller 1156 (along with any associated modules and/or sets of instructions in memory 1102) detect contact (and any movement or breaking of the contact) on touch screen 1112 and converts the detected contact into interaction with user-interface objects (e.g., one or more soft keys, icons, web pages or images) that are displayed on touch screen 1112. In an example embodiment, a point of contact between touch screen 1112 and the user corresponds to a finger of the user.

Touch screen 1112 may use LCD (liquid crystal display) technology, LPD (light emitting polymer display) technology, or LED (light emitting diode) technology, although other display technologies may be used in other embodiments. Touch screen 1112 and display controller 1156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1112. In an example embodiment, projected mutual capacitance sensing technology may be used.

Touch screen 1112 may have a video resolution in excess of 100 dots per inch (dpi). In some embodiments, the touch screen has a video resolution of approximately 160 dpi. The user may make contact with touch screen 1112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1112 or an extension of the touch-sensitive surface formed by the touch screen.

Device 1100 also includes power system 1162 for powering the various components. Power system 1162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1100 may also include one or more optical sensors or cameras 1164. FIG. 11 shows an optical sensor coupled to optical sensor controller 1158 in I/O subsystem 1106. Optical sensor 1164 may include charge-coupled device (CCD) or complementary metal-oxide semiconductor (CMOS) phototransistors. Optical sensor 1164 receives light from the environment, projected through one or more lens, and converts the light to data representing an image. In conjunction with imaging module 1143 (also called a camera module), optical sensor 1164 may capture still images or video. In some embodiments, an optical sensor is located on the back of device 1100, opposite touch screen display 1112 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 1100 may also include one or more proximity sensors 1166. FIG. 11 shows proximity sensor 1166 coupled to peripherals interface 1118. Alternatively, proximity sensor 1166 may be coupled to input controller 1160 in I/O subsystem 1106. In some embodiments, the proximity sensor turns off and disables touch screen 1112 when the multifunction device is placed near the user's ear (e.g., when the user is making a phone call).

Device 1100 includes one or more orientation sensors 1168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1100. In some embodiments, the one or more orientation sensors include any combination of orientation/rotation sensors. FIG. 11 shows the one or more orientation sensors 1168 coupled to peripherals interface 1118. Alternatively, the one or more orientation sensors 1168 may be coupled to an input controller 1160 in I/O subsystem 1106. In some embodiments, information is displayed on the touch screen display in a portrait view or a landscape view based on an analysis of data received from the one or more orientation sensors.

In some embodiments, the software components stored in memory 1102 include operating system 1126, communication module (or set of instructions) 1128, contact/motion module (or set of instructions) 1130, graphics module (or set of instructions) 1132, text input module (or set of instructions) 1134, Global Positioning System (GPS) module (or set of instructions) 1135, arbiter module 1157 and applications (or sets of instructions) 1136. Furthermore, in some embodiments memory 1102 stores device/global internal state 1157, as shown in FIGS. 1A-B and 7. Device/global internal state 1157 includes one or more of: active application state, indicating which applications, if any, are currently active; display state, indicating what applications, views or other information occupy various regions of touch screen display 1112; sensor state, including information obtained from the device's various sensors and input control devices 1116; and location information concerning the device's location and/or attitude.

Operating system 1126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1128 facilitates communication with other devices over one or more external ports 1124 and also includes various software components for handling data received by RF circuitry 1108 and/or external port 1124. External port 1124 (e.g., Universal Serial Bus (USB), FIREWIRE, etc.) is adapted for coupling directly to other devices or indirectly over a network (e.g., the Internet, wireless LAN, etc.).

Contact/motion module 1130 may detect contact with touch screen 1112 (in conjunction with display controller 1156) and other touch sensitive devices (e.g., a touchpad or physical click wheel). Contact/motion module 1130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1130 and display controller 1156 detect contact on a touchpad.

Contact/motion module 1130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1132 includes various known software components for rendering and displaying graphics on touch screen 1112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1132 stores data representing graphics to be used. Each graphic may be assigned a corresponding code. Graphics module 1132 receives, from applications etc., one or more codes specifying graphics to be displayed along with, if necessary, coordinate data and other graphic property data, and then generates screen image data to output to display controller 1156.

Text input module 1134, which may be a component of graphics module 1132, provides soft keyboards for entering text in various applications (e.g., contacts 1137, e-mail 1140, IM 141, browser 1147, and any other application that needs text input).

GPS module 1135 determines the location of the device and provides this information for use in various applications (e.g., to telephone 1138 for use in location-based dialing, to camera module 1143 as picture/video metadata, and to applications that provide location-based services such as weather widgets, local yellow page widgets, and map/navigation widgets).

Applications 1136 may include the following modules (or sets of instructions), or a subset or superset thereof:
- contacts module 1137 (sometimes called an address book or contact list);
- telephone module 1138;
- video conferencing module 1139;
- e-mail client module 1140;
- instant messaging (IM) module 1141;
- workout support module 1142;
- camera module 1143 for still and/or video images;
- image management module 1144;
- browser module 1147;
- calendar module 1148;
- widget modules 1149, which may include one or more of: weather widget 1149-1, stocks widget 1149-2, calculator widget 1149-3, alarm clock widget 1149-4, dictionary widget 1149-5, and other widgets obtained by the user, as well as user-created widgets 1149-6;
- widget creator module 1150 for making user-created widgets 1149-6;
- search module 1151;
- video and music player module 1152, which may be made up of a video player module and a music player module;
- notes module 1153;
- map module 1154; and/or
- online video module 1155.

Examples of other applications 1136 that may be stored in memory 1102 include other word processing applications, other image editing applications, drawing applications, presentation applications, JAVA-enabled applications, encryption, digital rights management, voice recognition, and voice replication.

In conjunction with touch screen 1112, display controller 1156, contact module 1130, graphics module 1132, and text input module 1134, contacts module 1137 may be used to manage an address book or contact list (e.g., stored in application internal state 1192 of contacts module 1137 in memory 1102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1138, video conference 1139, e-mail 1140, or IM 1141; and so forth.

In conjunction with RF circuitry 1108, audio circuitry 1110, speaker 1111, microphone 1113, touch screen 1112, display controller 1156, contact module 1130, graphics module 1132, and text input module 1134, telephone module 1138 may be used to enter a sequence of characters corresponding to a telephone number, access one or more telephone numbers in address book 1137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1108, audio circuitry 1110, speaker 1111, microphone 1113, touch screen 1112, display controller 1156, optical sensor 1164, optical sensor controller 1158, contact module 1130, graphics module 1132, text input module 1134, contact list 1137, and telephone module 1138, videoconferencing module 119 includes executable instructions to initiate, conduct, and terminate a video conference between a user and one or more other participants in accordance with user instructions.

In conjunction with RF circuitry 1108, touch screen 1112, display controller 1156, contact module 1130, graphics module 1132, and text input module 1134, e-mail client module 1140 includes executable instructions to create, send, receive, and manage e-mail in response to user instructions. In conjunction with image management module 1144, e-mail client module 1140 makes it very easy to create and send e-mails with still or video images taken with camera module 1143.

In conjunction with RF circuitry 1108, touch screen 1112, display controller 1156, contact module 1130, graphics module 1132, and text input module 1134, the instant messaging module 1141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1108, touch screen 1112, display controller 1156, contact module 1130, graphics module 1132, text input module 1134, GPS module 1135, map module 1154, and music player module 1146, workout support module 1142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1112, display controller 1156, optical sensor(s) 1164, optical sensor controller 1158, contact module 1130, graphics module 1132, and image management module 1144, camera module 1143 includes executable instructions to capture still images or video (including a video stream) and store them into memory 1102, modify characteristics of a still image or video, or delete a still image or video from memory 1102.

In conjunction with touch screen 1112, display controller 1156, contact module 1130, graphics module 1132, text input module 1134, and camera module 1143, image management module 1144 includes executable instructions to arrange, modify (e.g., edit), or otherwise manipulate, label, delete, present (e.g., in a digital slide show or album), and store still and/or video images.

In conjunction with RF circuitry 1108, touch screen 1112, display system controller 1156, contact module 1130, graphics module 1132, and text input module 1134, browser module 1147 includes executable instructions to browse the Internet in accordance with user instructions, including searching, linking to, receiving, and displaying web pages or portions thereof, as well as attachments and other files linked to web pages.

In conjunction with RF circuitry 1108, touch screen 1112, display system controller 1156, contact module 1130, graphics module 1132, text input module 1134, e-mail client module 1140, and browser module 1147, calendar module 1148 includes executable instructions to create, display, modify, and store calendars and data associated with calendars (e.g., calendar entries, to do lists, etc.) in accordance with user instructions.

In conjunction with RF circuitry 1108, touch screen 1112, display system controller 1156, contact module 1130, graphics module 1132, text input module 1134, and browser module 1147, widget modules 1149 are mini-applications that may be downloaded and used by a user (e.g., weather widget 1149-1, stocks widget 1149-2, calculator widget 11493, alarm clock widget 1149-4, and dictionary widget 1149-5) or created by the user (e.g., user-created widget 1149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1108, touch screen 1112, display system controller 1156, contact module 1130, graphics module 1132, text input module 1134, and browser module 1147, the widget creator module 1150 may be used by a user to create widgets (e.g., turning a user-specified portion of a web page into a widget).

In conjunction with touch screen 1112, display system controller 1156, contact module 1130, graphics module 1132, and text input module 1134, search module 1151 includes executable instructions to search for text, music, sound, image, video, and/or other files in memory 1102 that match one or more search criteria (e.g., one or more user-specified search terms) in accordance with user instructions.

In conjunction with touch screen 1112, display system controller 1156, contact module 1130, graphics module 1132, audio circuitry 1110, speaker 1111, RF circuitry 1108, and browser module 1147, video and music player module 1152 includes executable instructions that allow the user to download and play back recorded music and other sound files stored in one or more file formats, such as MP3 or AAC files, and executable instructions to display, present or otherwise play back videos (e.g., on touch screen 1112 or on an external, connected display via external port 1124). In some embodiments, device 1100 may include the functionality of an MP3 player.

In conjunction with touch screen 1112, display controller 1156, contact module 1130, graphics module 1132, and text input module 1134, notes module 1153 includes executable instructions to create and manage notes, to do lists, and the like in accordance with user instructions.

In conjunction with RF circuitry 1108, touch screen 1112, display system controller 1156, contact module 1130, graphics module 1132, text input module 1134, GPS module 1135, and browser module 1147, map module 1154 may be used to receive, display, modify, and store maps and data associated with maps (e.g., driving directions; data on stores and other points of interest at or near a particular location; and other location-based data) in accordance with user instructions.

In conjunction with touch screen 1112, display system controller 1156, contact module 1130, graphics module 1132, audio circuitry 1110, speaker 1111, RF circuitry 1108, text input module 1134, e-mail client module 1140, and browser module 1147, online video module 1155 includes instructions that allow the user to access, browse, receive (e.g., by streaming and/or download), play back (e.g., on the touch screen or on an external, connected display via external port 1124), send an e-mail with a link to a particular online video, and otherwise manage online videos in one or more file formats, such as H.264. In some embodiments, instant messaging module 1141, rather than e-mail client module 1140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1102 may store a subset of the modules and data structures identified above. Furthermore, memory 1102 may store additional modules and data structures not described above.

In some embodiments, device 1100 is a device where operation of a predefined set of functions on the device is performed exclusively through a touch screen and/or a touchpad. By using a touch screen and/or a touchpad as the primary input control device for operation of device 1100, the number of physical input control devices (such as push buttons, dials, and the like) on device 1100 may be reduced.

The predefined set of functions that may be performed exclusively through a touch screen and/or a touchpad include navigation between user interfaces. In some embodiments, the touchpad, when touched by the user, navigates device 1100 to a main, home, or root menu from any user interface that may be displayed on device 1100. In such embodiments, the touchpad may be referred to as a "menu button." In some other embodiments, the menu button may be a physical push button or other physical input control device instead of a touchpad.

Figure 12:
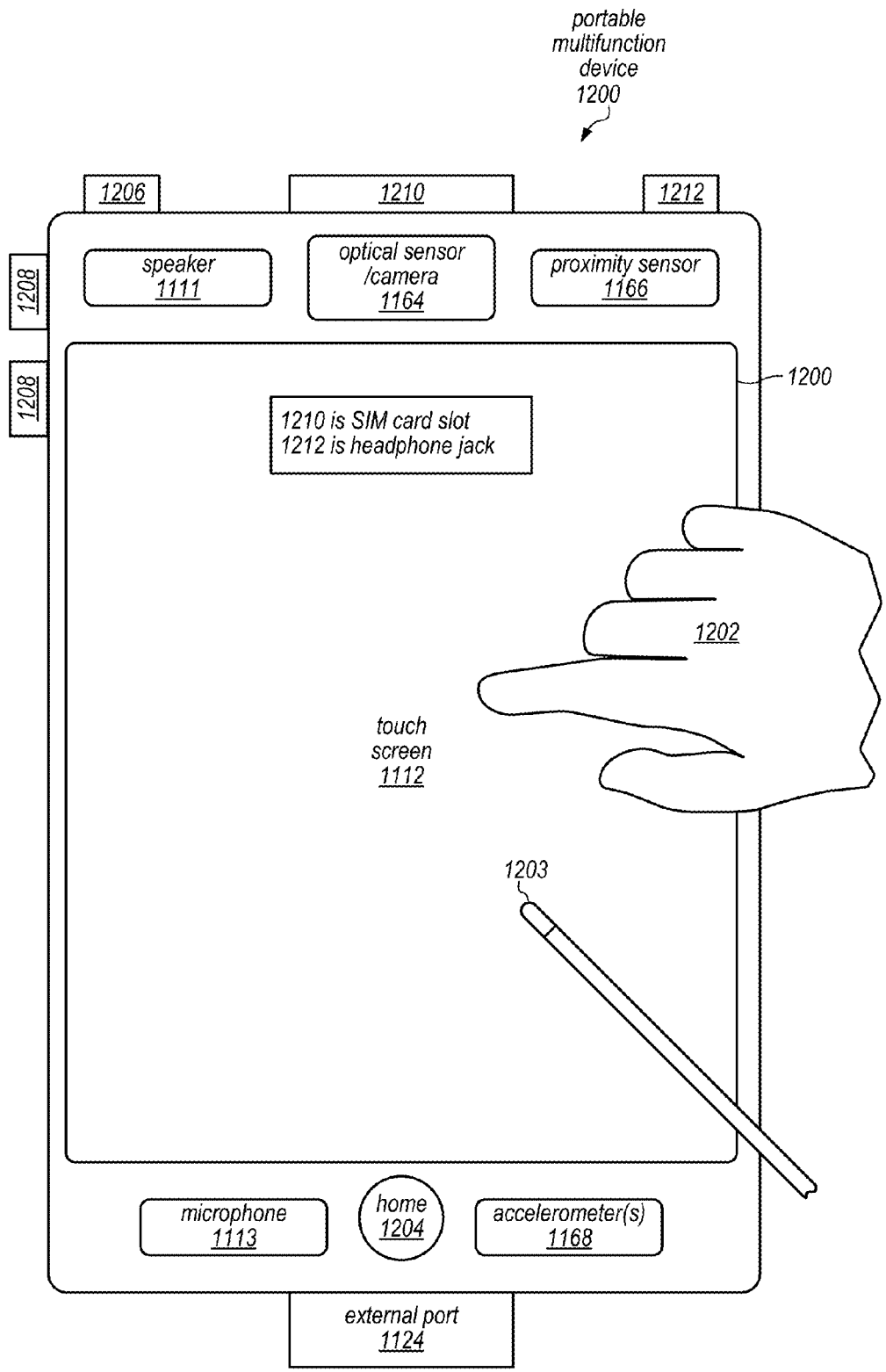
FIG. 12 depicts a portable multifunction device having a camera, according to some embodiments.

FIG. 12 illustrates a portable multifunction device 1100 having a touch screen 1112 in accordance with some embodiments. The touch screen may display one or more graphics within user interface (UI) 1200. In this embodiment, as well as others described below, a user may select one or more of the graphics by making a gesture on the graphics, for example, with one or more fingers 1202 (not drawn to scale in the Figure) or one or more styluses 1203 (not drawn to scale in the figure).

Device 1100 may also include one or more physical buttons, such as "home" or menu button 1204. As described previously, menu button 1204 may be used to navigate to any application 1136 in a set of applications that may be executed on device 1100. Alternatively, in some embodiments, the menu button is implemented as a soft key in a graphics user interface (GUI) displayed on touch screen 1112.

In one embodiment, device 1100 includes touch screen 1112, menu button 1204, push button 1206 for powering the device on/off and locking the device, volume adjustment button(s) 1208, Subscriber Identity Module (SIM) card slot 1210, head set jack 1212, and docking/charging external port 1124. Push button 1206 may be used to turn the power on/off on the device by depressing the button and holding the button in the depressed state for a predefined time interval; to lock the device by depressing the button and releasing the button before the predefined time interval has elapsed;

and/or to unlock the device or initiate an unlock process. In an alternative embodiment, device 1100 also may accept verbal input for activation or deactivation of some functions through microphone 1113.

It should be noted that, although many of the examples herein are given with reference to optical sensor/camera 1164 (on the front of a device), a rear-facing camera or optical sensor that is pointed opposite from the display may be used instead of or in addition to an optical sensor/camera 1164 on the front of a device. Embodiments of an actuator module 2000 that includes passive damping for optical image stabilization (OIS) may be used in the optical sensor/camera(s) 1164.

Example Computer System

Figure 13:
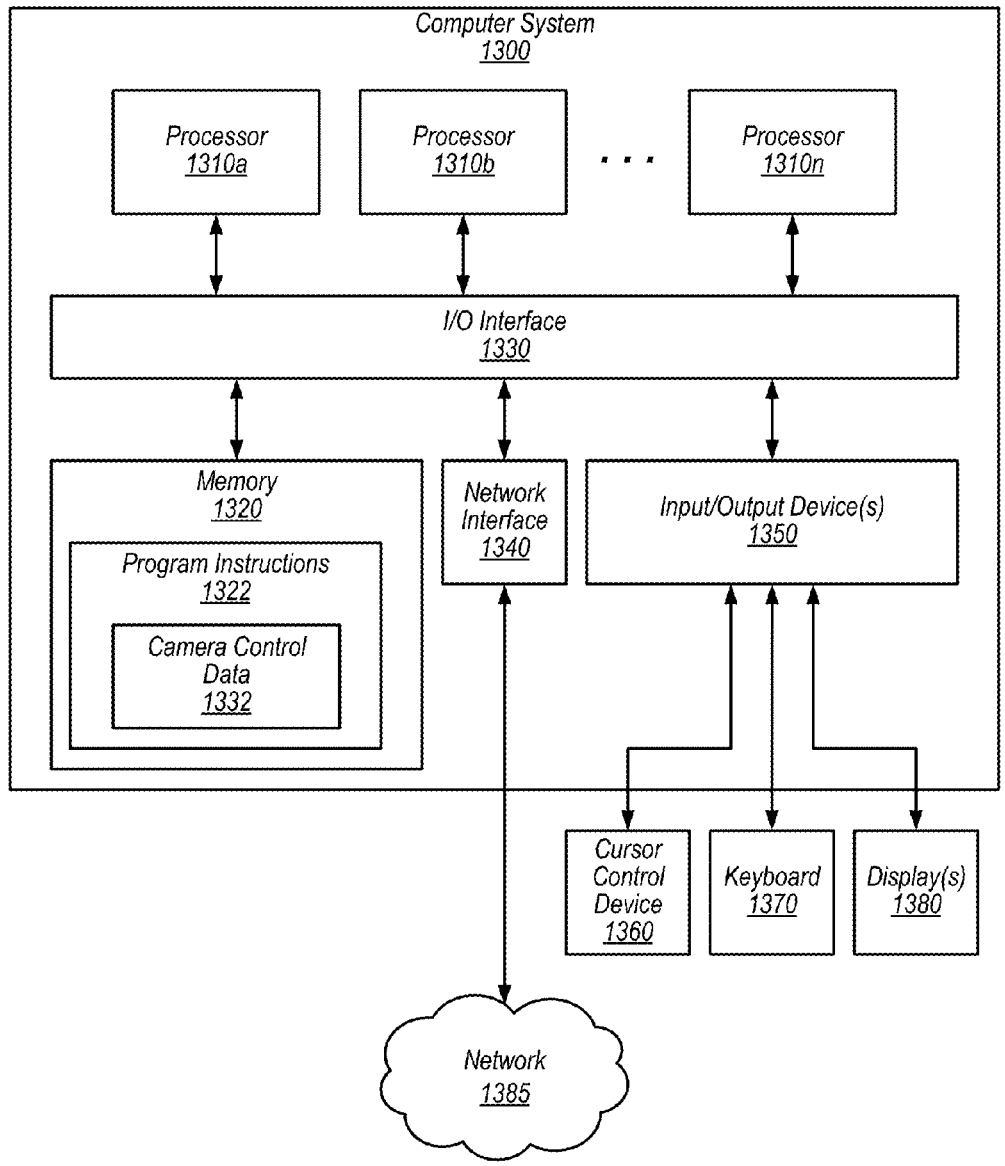
FIG. 13 illustrates an example computer system configured to implement aspects of a system and method for camera control, according to some embodiments.

FIG. 13 illustrates an example computer system 1300 that may be configured to include or execute any or all of the embodiments described above. In different embodiments, computer system 1300 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, may be executed in one or more computer systems 1300, which may interact with various other devices. Note that any component, action, or functionality described above with respect to FIGS. 1 through 12 may be implemented on one or more computers configured as computer system 1300 of FIG. 13, according to various embodiments. In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs), such as the x8 13, PowerPC, SPARC, or MIPS ISAs, or any other suitable ISA. In multiprocessor systems, each of processors 1310 may commonly, but not necessarily, implement the same ISA.

System memory 1320 may be configured to store camera control program instructions 1322 and/or camera control data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions 1322 may be configured to implement a lens control application 1324 incorporating any of the functionality described above. Additionally, existing camera control data 1332 of memory 1320 may include any of the information or data structures described above. In some embodiments, program instructions and/or data may be received, sent or stored upon different types of computer-accessible media or on similar media separate from system memory 1320 or computer system 1300. While computer system 1300 is described as implementing the functionality of functional blocks of previous Figures, any of the functionality described herein may be implemented via such a computer system.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network 1385 (e.g., carrier or agent devices) or between nodes of computer system 1300. Network 1385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1322, which may be processor-executable to implement any element or action described above. In one embodiment, the program instructions may implement the methods described above. In other embodiments, different elements and data may be included. Note that data may include any data or information described above.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus for controlling the motion of a mobile component relative to a static component, the apparatus comprising:
   a static component comprising a plurality of magnets, wherein each magnet of the plurality of magnets is poled with magnetic domains substantially aligned in a common particular direction throughout each magnet; and
   a flat coil assembly physically coupled, orthogonally to the particular direction, to a set of exterior sides of the mobile component in a magnetic field of at least one magnet of the plurality of magnets and electrically coupled to a power source, and configured to adjust a position of the mobile component, relative to the static component, in parallel to the particular direction, based at least in part upon Lorentz forces, wherein the flat coil assembly comprises at least two flat coils including a first flat coil situated proximate a first exterior side of the mobile component and a second flat coil situated proximate a second exterior side of the mobile component, wherein the second exterior side is opposite the first exterior side of the mobile component, wherein each flat coil of the at least two flat coils comprises:
   a respective set of conductor elements at least partially bounded by a respective set of insulator elements within an interior of the flat coil assembly; and
   the respective set of conductor elements forms a respective coil structure, within the interior of the flat coil assembly, which coils in a direction orthogonal to the particular direction and is configured to generate the Lorentz forces responsive to an electrical current passing through the respective conductor elements.

2. The apparatus of claim 1, wherein:
   each flat coil comprises a plurality of physically coupled layers, each layer comprising a respective pattern of conductor elements and insulator elements, which collectively establish a respective coil structure within the interior of the flat coil assembly.

3. The apparatus of claim 1, wherein:
   the at least two flat coils are configured to be electrically coupled to the power source in series.

4. The apparatus of claim 1, wherein:
   the mobile component comprises an optics carrier comprised in a camera device and comprising an optics component; and
   the flat coil assembly is configured to adjust a position of the optics carrier, relative to an image sensor in the camera device along an axis parallel to an optical axis of the optics component for focus adjustment.

5. The apparatus of claim 1, wherein:
   the flat coil assembly is configured to be coupled to the mobile component as a monolithic component.

6. The apparatus of claim 1, wherein:
   the flat coil assembly comprises a flexible electrical connection that is physically coupled to an electrical terminal to electrically couple the flat coil assembly to the power source, wherein the flexible electrical connection is configured to flex, to maintain the electrical coupling of the flat coil assembly and the power source, as the mobile component moves, relative to the static component.

7. An apparatus, comprising:
a camera device comprising a Lorentz actuator mechanism configured to adjustably position an optics carrier that comprises an optics component, relative to an image sensor, in a direction in parallel to an optical axis of the optics component based at least in part upon Lorentz forces, wherein the Lorentz actuator mechanism comprises:
at least one flat coil assembly, which is separate from the optics carrier and is configured to couple directly with the optics carrier and generate Lorentz forces based at least in part upon an electrical current applied to the flat coil assembly, wherein the at least one flat coil assembly comprises:
at least two flat coils including a first flat coil situated proximate a first exterior side of the optics carrier and a second flat coil situated proximate a second exterior side of the optics carrier, wherein the second exterior side is opposite the first exterior side of the optics carrier, wherein each flat coil of the at least two flat coils comprises:
a respective set of conductor elements, coupled in series through an interior of the at least one flat coil assembly to collectively form a respective coil structure, within the interior of the at least one flat coil assembly, which coils in a direction orthogonal to the optical axis and is configured to generate the Lorentz forces based at least in part upon an electrical current passing through the respective set of conductor elements.

8. The apparatus of claim 7, wherein:
each respective flat coil comprises a respective multilayer coil structure comprising a plurality of physically coupled layers, each layer extending parallel to the direction of the coiling of the coil structure and comprising a respective pattern of conductor elements and insulator elements, which collectively establish the respective coil structure based at least in part upon physically coupling of the layers to electrically couple the respective pattern of conductor elements.

9. The apparatus of claim 7, wherein:
the at least one flat coil assembly is configured to be coupled to a static component via one or more spring assemblies, wherein the static component comprises the image sensor and wherein the one or more spring assemblies are configured to at least partially restrict a range of motion of the optics carrier along the optical axis.

10. The apparatus of claim 7, wherein:
the at least one flat coil assembly further comprises:
a frame structure coupled to the optics carrier, wherein the first flat coil and the second flat coil are physically coupled to the frame structure.

11. The apparatus of claim 7, wherein:
the at least one flat coil assembly is configured to couple directly with the optics carrier as a monolithic component.

12. The apparatus of claim 7, wherein:
the first flat coil and the second flat coil are electrically coupled to a power source in series.

13. A method, comprising:
assembling a camera device comprising an image sensor and an optics carrier configured to accommodate an optics component, wherein the camera device is configured to adjust a position of the optics component, relative to the image sensor, in a direction parallel with an optical axis of the optics component based at least in part upon Lorentz forces applied to the optics carrier, the assembling comprising:
physically coupling a flat coil assembly to the optics carrier, wherein the flat coil assembly is separate from the optics carrier and is configured to generate the Lorentz forces responsive to an internal electrical current through at least one internal coil structure comprising at least one internal conductor element while the flat coil assembly is located in a magnetic field of at least one magnet, wherein the flat coil assembly includes at least two flat coils, wherein when the flat coil assembly is coupled to the optics carrier a first flat coil of the at least two flat coils is situated proximate a first external side of the optics carrier and a second flat coil of the at least two flat coils is situated proximate a second external side of the optics carrier that is opposite the first external side of the optics carrier.

14. The method of claim 13, wherein:
the flat coil assembly comprises a frame structure configured to accommodate a plurality of flat coils on opposite sides of the frame structure, wherein each flat coil comprises a respective at least one internal coil structure comprising at least one internal conductor element;
the method further comprises coupling each of the plurality of flat coils to the frame structure to establish the flat coil assembly; and
the physically coupling the flat coil assembly to the optics carrier comprises coupling the frame structure to the optics carrier that extends in parallel with the optical axis.

15. The method of claim 14,
further comprising electrically coupling the plurality of flat coils together in series.

16. The method of claim 13, wherein:
physically coupling the flat coil assembly to the optics carrier comprises coupling the flat coil assembly, to the optics carrier, as a monolithic component.

17. The method of claim 16, wherein:
each flat coil included in the flat coil assembly is prefabricated separately from the optics carrier.

18. The method of claim 17, wherein:
the flat coil assembly is coupled to the optics carrier prior to coupling the optics carrier to the at least one magnet and prior to coupling the at least one magnet to a static component which comprises the image sensor.

19. The method of claim 13, wherein:
the flat coil assembly comprises a flexible electrical connection that is configured to flex, to maintain an electrical connection between the flat coil assembly and a power source, concurrently with the flat coil assembly generating Lorentz forces to adjust a position of the optics component, relative to the image sensor.

* * * * *